United States Patent [19]
Yamazaki et al.

[11] Patent Number: 5,410,410
[45] Date of Patent: Apr. 25, 1995

[54] NON-CONTACT TYPE MEASURING DEVICE FOR MEASURING THREE-DIMENSIONAL SHAPE USING OPTICAL PROBE

[75] Inventors: Kazuo Yamazaki, El Macero; Hideki Aoyama, Tomakomai, Japan

[73] Assignee: Mitutoyo Corporation, Kanagawa, Japan

[21] Appl. No.: 997,759

[22] Filed: Dec. 29, 1992

[51] Int. Cl.⁶ ............................................. G01B 11/24
[52] U.S. Cl. .................................................... 356/376
[58] Field of Search ............................ 356/375, 376; 250/227.28

[56] References Cited

U.S. PATENT DOCUMENTS 3,871,771  3/1975  Scott ................................. 356/364
4,459,022  7/1984  Morey ............................ 250/227.28

OTHER PUBLICATIONS

Bukow, Hans. Fiber Optic Distance Sensor for Robotic Applications SME 1986 Technical Papers, pp. MS86-938-1 thru MS86-938-9.

*Primary Examiner*—Vincent P. McGraw
*Assistant Examiner*—Russell C. Wolfe
*Attorney, Agent, or Firm*—Seed & Berry

[57] ABSTRACT

A sensor unit of an optical probe includes an illuminating device having an illuminating point arranged on the central portion of a detective surface facing a to-be-measured object, and eight light receiving devices arranged on the x and y axes in the detective surface, for receiving a reflected light from the object, four light receiving points among those of the eight light receiving devices being symmetrically arranged on the x axis with respect to the illuminating point and the remaining four light receiving points thereof being symmetrically arranged on the y axis with respect to the illuminating point. The rotation angle $\theta$ of the unit normal vector around the x axis and the rotation angle $\phi$ thereof around the y axis in the detective surface are calculated by processing the amounts of light received by the eight light receiving devices of the sensor unit.

10 Claims, 25 Drawing Sheets

BOTTOM VIEW

SIDE VIEW

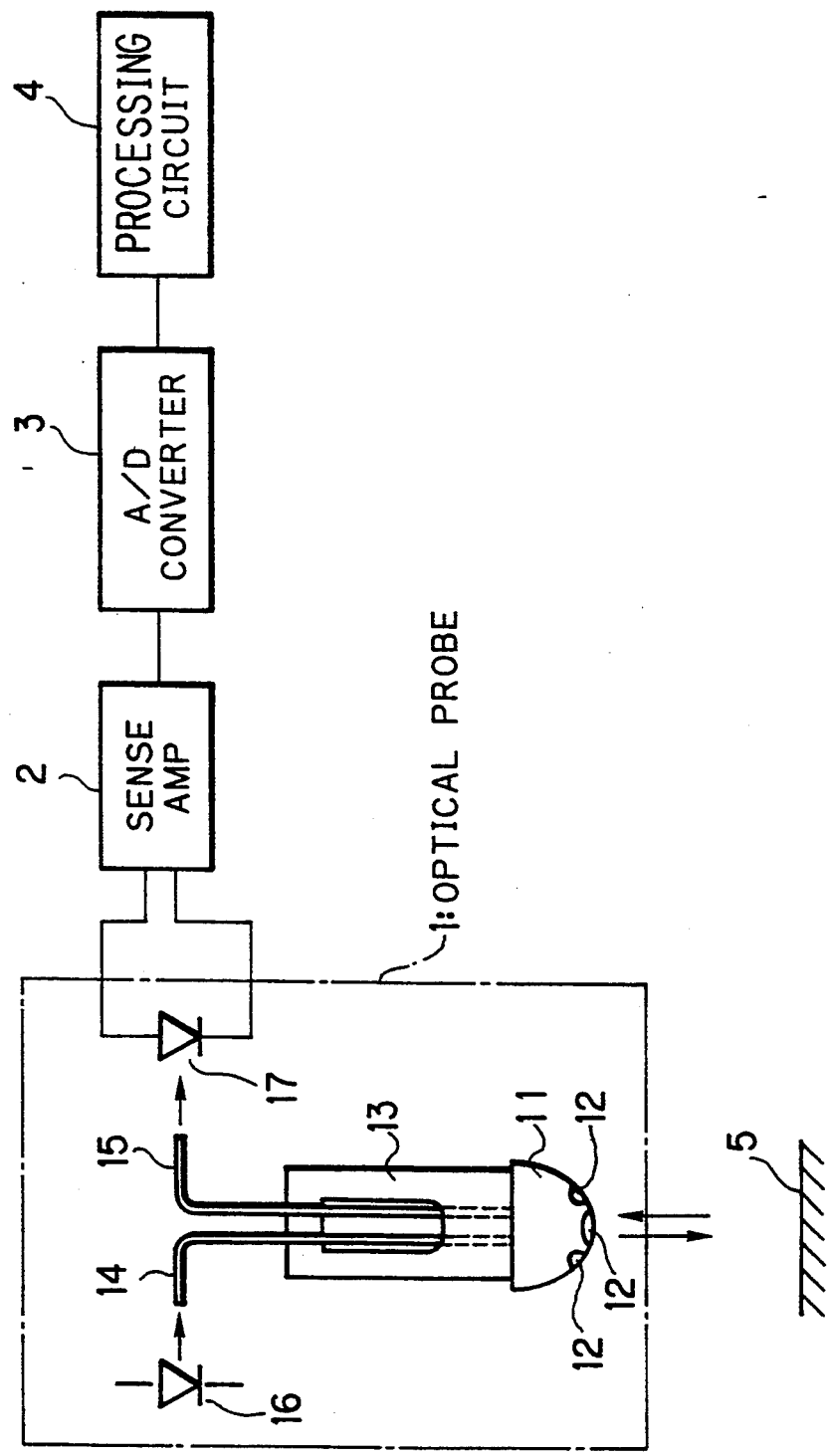

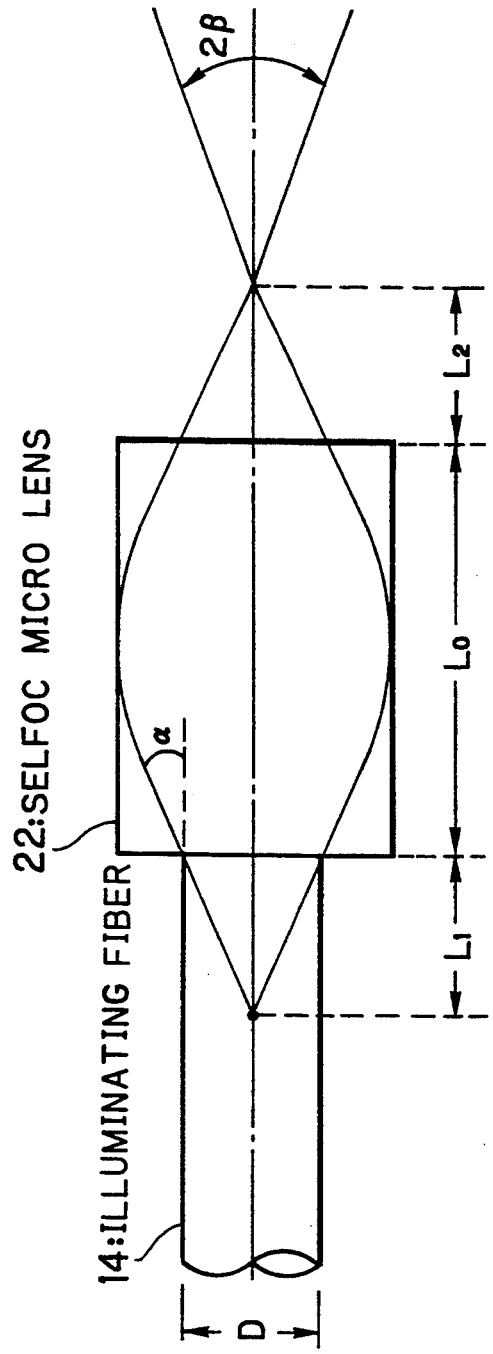

BOTTOM VIEW

SIDE VIEW

BOTTOM VIEW

SIDE VIEW

NON-CONTACT TYPE MEASURING DEVICE FOR MEASURING THREE-DIMENSIONAL SHAPE USING OPTICAL PROBE

BACKGROUND OF THE INVENTION

1. Field of the Invention

This invention relates to a measuring device for measuring the three-dimensional shape of an object in a non-contact type manner by use of an optical probe.

2. Description of the Related Art

Conventionally, various types of optical shape measuring devices have been proposed. There are two types of measurement principles of the optical shape measuring devices: one type utilizing the geometric optical property of light and the other type utilizing the wave optical property of light. Further, the measurement method includes a passive method of detecting a reflected light from an object in the natural light and an active method of applying light to an object by using a special light source and detecting a reflected light from the object.

When the shape of a spherical surface is measured, the active method utilizing the geometric property of light can be adequately used. This is because it is generally required to determine measurement points when the shape of the spherical surface is measured. Therefore, a method of focusing an optical beam on a measurement point and then determining the position based on information of light reflected from the measurement point is used.

An optical probe (including a semiconductor laser and an optical position detecting sensor) represented by a laser scanning probe of RENISHAW utilizes the trigonometrical survey as a basic principle. This type of optical probe is practical in the measurement precision and the measurement range, but since it has the shadow effect, the tilt angle of a to-be-measured object which can be measured by use of this optical probe is limited. For this reason, various methods for attaining enhancement of the measurement precision and reduction in the shadow effect are proposed. However, in the sensor based on the trigonometric survey, the influence by the shadow effect cannot be prevented if the light projection angle is fixed. Further, a range finder using a CCD camera is proposed as a sensor of measuring the entire shape of an object at a high speed. In this case, however, the influence by the shadow effect cannot be eliminated and it is not satisfactory as a shape measuring sensor from the viewpoint of the measurement precision.

Several methods using an optical fiber as an optical distance sensor are proposed. For example, such methods are disclosed in the following articles:

- G. Hull-Allen: Reflectivity Compensation and Linearization of Fiber Optic Proximity Probe Response, SPIE, Vol.518, Optical System Engineering, 1984, p 81;
- L. Hoogenboom, G. Hull-Allen, S. Wang: Theoretical and Experimental Analysis of a Fiber Optic Proximity Probe, SPIE, Vol.478, Fiber Optics and Laser Sensors, 1984. p 46;
- H. Kopola, S. Nissila, R. Myllyla, P. Karkkaisen: Intensity Modulated Fiber Sensor for Robot Feedback Control in Precision Assembly, SPIE, Vol.798, Fiber Optic Sensors, 1987, p166;
- G. Conforty, M. Brenci, A. Mencaglia, A. G. Mignani, A. M. Scheggi: Optical Fiber Sensor for Vibration Monitoring in High Power Electrical Plants, SPIE, Vol.1011, Fiber Optic Sensors, 1988, p 116;
- F. C. Cuomo: The Analysis of a Three-Fiber Lever Transducer, SPIE, Fiber Optic and Laser Sensor, 1984, p 29; and
- L. Xiaoming, R. Xin, W. Peizheng, C. Rongsheng: Reflective Optical Fiber Displacement Sensor, SPIE, Vol. 1572, International Conference on Optical Fiber Sensors in china, 1911, p 248.

The above methods are effected to measure a distance based on an amount of reflected light obtained by applying a light beam from an emitter fiber to a to-be-measured object and detecting the reflected light by use of a detector fiber. Further, the above methods are effective when the inclination of the surface of the object, the intensity of light from the light source and surface reflectance characteristic (surface diffusion characteristic) of the surface of the object are constant. However, the measurement of shape including the inclination of the object surface is difficult.

Therefore, H. Bukow et al. have proposed a method of measuring a distance based on a difference between amounts of light in two detector fibers which are provided for the emitter fiber in order to reduce the influence by the inclination of the object surface, the intensity of light from the light source and the surface reflectance characteristic of the object surface. For example, refer to the following articles:

- H. Bukow: Fiber Optics Distance Sensor for Robotic Application, Technical Paper of SME Conference (Sensor 86, Detroit, Michigan), 1986; and
- H. Bukow, M. Bailey, W. Stevenson: Simulation of Reflectance Sensors Using Image Synthesis Techniques, Computers in Mechanical Engineering, January 1985, p 69.

In their experimentally manufactured probe, in order to reduce the influence of the shadow effect and enhance the measurement precision, four sets of detector fibers each set including two detector fibers are arranged at a 90 deg. interval around the emitter fiber. With the experimentally manufactured probe, variations in the inclination of the surface of the object, the intensity of light from the light source and surface reflectance characteristic of the surface of the object can be offset to some extent. However, when the inclination of the object surface exceeds 30deg., it becomes difficult to detect the reflected light. Further, in their above paper, only the distance measurement using the experimentally manufactured probe is referred to and the normal detection method for the measurement points of the object is not disclosed. In order to develop an automatic high-speed learning control system, it is not sufficient for the sensor to have the distance detection function but the unit normal vector detection function must be provided.

For example, R. Shoureshi et al. have constructed a learning control system by attaching a distance sensor proposed by H. Bukow et al. to the front end of a robot hand (refer to R. Shoureshi, R. Evans, W. Stevenson: Optically Driven Learning Control for Industrial Manipulators, IEEE Control Systems Magazine, October 1989, p 21). However, this system is designed for automatic brushing, painting, debugging, welding and seam tracking and is not required for enhancing the positioning precision of the robot hand and increasing the positioning speed. Further, the above system is designed to deal with a curved surface having small variations in the gradient and curvature thereof. T. Miyoshi et al. tried to effect the high-speed learning measurement for the curved surface by setting a distance sensor based on the trigonometric survey on the main shaft of a machine tool (for example, refer to T. Miyoshi, T. Kondo, K. Saito, Y. Kamiya, H. Okada: Development of Non-Contact 3-D Digitizing System, Journal of JSPE, Vol.56, No.6, 1990, p 1021). In this case, however, since the learning measurement using only distance information is effected, there occurs a limitation of possibility for enhancing the control speed and smooth controllability.

SUMMARY OF THE INVENTION

An object of this invention is to provide a non-contact type shape measuring device which uses an optical probe and which can effect not only the distance measurement with high precision but also the unit normal vector measurement at the measurement points on a to-be-measured object.

Another object of this invention is to provide a non-contact type shape measuring device which uses an optical probe and which can effect the highly precise distance measurement and unit normal vector measurement without receiving the influence of spurious light present in the measuring environment.

Still another object of this invention is to provide a non-contact type shape measuring device which uses an optical probe, which can be effectively used as an automatic learning conrol system and which has a wide range for the unit normal vector measurement.

Another object of this invention is to provide a non-contact type shape measuring method which uses an optical probe and which can compensate for the measurement error caused by mis-alignment of the optical axis of the probe and effect the highly precise distance measurement and unit normal vector measurement.

A non-contact type shape measuring device for measuring a 3-D shape of an object according to this invention comprises an optical probe having a sensor unit which is attached to a probe body and includes illuminating means having an illuminating point arranged at the center of a detective surface facing a to-be-measured object and at least eight light receiving means arranged on a first straight line passing the illuminating point in the detective surface and a second straight line different from the first straight line, for receiving a reflected light from the object; and processing means for deriving a normal vector in that position of the object which is illuminated by the illuminating means according to output signals of the light receiving means. Four light receiving points among those of the eight light receiving means are symmetrically arranged on the first straight line with respect to the illuminating point and the remaining four light receiving points thereof are symmetrically arranged on the second straight line with respect to the illuminating point.

According to this invention, a gap distance (that is, position vector) from the probe to the measurement point is determined by amounts of light detected by the eight receiving means arranged around the illuminating point. For example, the eight receiving means are arranged on two concentric circles at a 90 deg. interval. The influence by the inclinaton of the measurement point with respect to a to-be-measured distance can be eliminated by deriving an average value of the amounts of light received by the receiving means. The orientation of the measurement position, that is, normal vector can be obtained by deriving a difference between amounts of light detected by two sets of receiving means symmetrically arranged on the first straight line with respect to the illuminating point and a difference between amounts of light detected by the other two sets of receiving means symmetrically arranged on the second straight line with respect to the illuminating point. Further, in the above measurement, the influence by the light intensity of the light source can be eliminated by normalizing a to-be-derived light amount or light amount difference by use of the total light amount detected by the plurality of receiving means.

BRIEF DESCRIPTION OF THE DRAWINGS

This invention will be described in detail with reference to the accompanying drawings wherein:

FIG. 1 is a diagram showing the entire construction of a measuring device according to one embodiment of this invention;

FIG. 5 is a diagram showing the spread of an illumination beam by the sensor unit;

DETAILED DESCRIPTION OF THE PREFERRED EMBODIMENTS

Figure 2A:
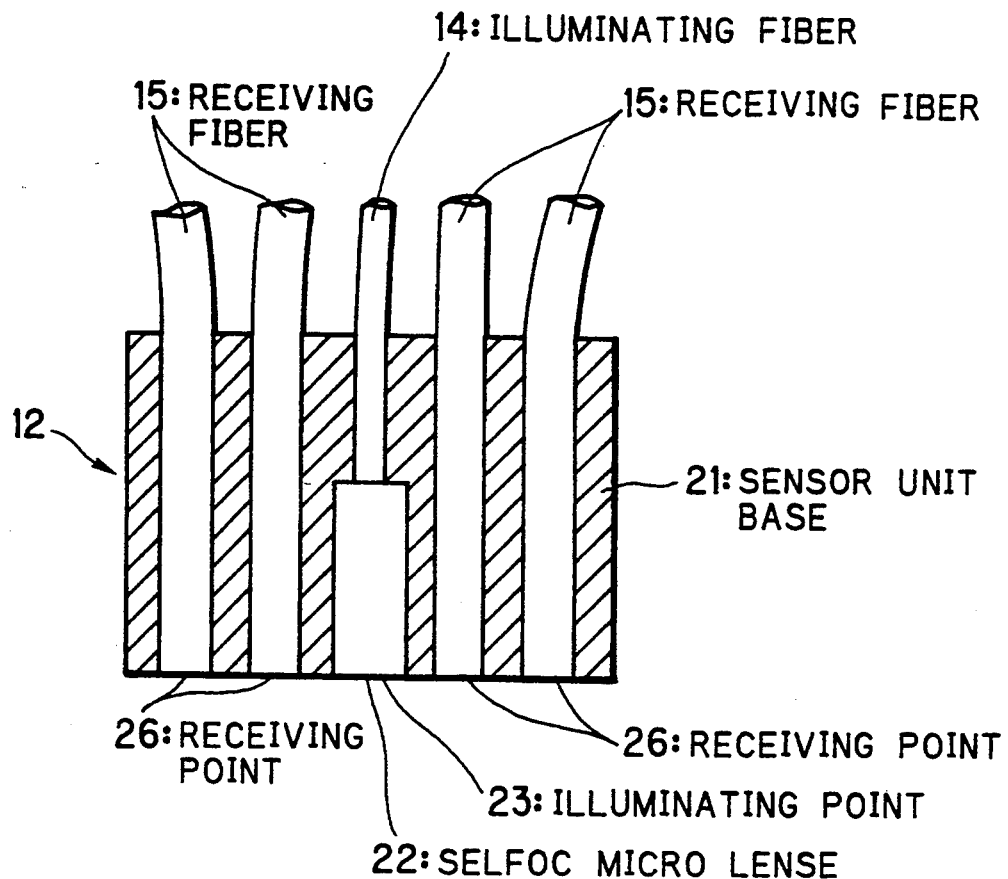
FIGS. 2A and 2B are a side view (cross section) and a bottom view of a sensor unit.

FIG. 1 shows the entire construction of a measuring device according to one embodiment of this invention. An optical probe 1 is an active type probe for measuring a gap distance (position vector) to a to-be-measured object 5 and the tilt (unit normal vector) of the measurement plane in a non-contact manner. An output signal from the optical probe 1 is amplified by a sense amplifier 2. In FIG. 1, only one output signal series is shown, but in practice, the optical probe 1 has a plurality of sensor units as will be described later and output signal series of a number corresponding to that of the sensor units are provided. The signal amplified by the sense amplifier 2 is converted into a digital form by an A/D converter 3 and then supplied to a processing circuit 4. The processing operation is described in detail later.

The optical probe 1 includes a semi-spherical probe body 11, a plurality of sensor units 12 attached to the probe body 11, and a probe shank 13 for supporting the probe body 11. The surface of the probe body 11 which is set to face the object 5 is spherical and the sensor units 12 are arranged with the detective surfaces thereof set to correspond to the spherical surface of the probe body 11. Each of the sensor units 12 is coupled to a light source 16 which is formed of a laser diode (LD) or light emitting diode (LED) via an illuminating fiber 14 and coupled to a light receiving element 17 via a light receiving fiber 15. The sensor units 12 will be described in detail later.

Figure 2B:
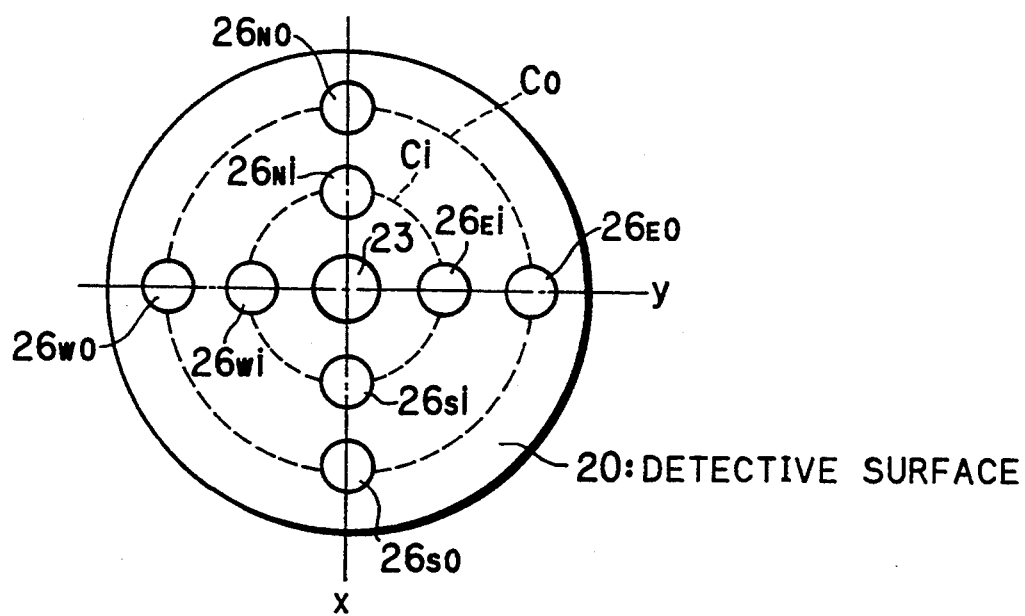

FIGS. 2A and 2B are a side view (cross section) and a bottom view of one of the sensor units 12 of the optical probe 1. A collimating selfoc micro lens 22 is buried in the central front end portion of a sensor unit base 21. One end of the lens 22 is exposed to a detective surface 20 facing the object as an illuminating point 23. The illuminating fiber 14 coupled to the other end portion of the lens 22 is buried in the central portion of the sensor unit base 21. A plurality of light receiving fibers 15 are buried in the sensor unit base 21 to surround the illuminating fiber 14. One end of each of the receiving fibers 15 is exposed to the detective surface 20 as a light receiving point 26. As shown in FIG. 2B, it is necessary to arrange at least eight receiving points 26 in the detective surface 20.

The arrangement of the illuminating point 23 and receiving points 26 in the detective surface 20 is set as shown in FIG. 2B. Two straight lines passing the illuminating point 23 in the detective surface 20 are imaginarily set, and in this embodiment, x and y axes which cross at right angles are imaginarily set. Two receiving points 26Si and 26So and two receiving points 26Ni and 26No are symmetrically arranged on the x axis with respect to the illuminating point 23. Likewise, two receiving points 26Ei and 26Eo and two receiving points 26Wi and 26Wo are symmetrically arranged on the y axis with respect to the illuminating point 23. In other words, the four receiving points 26Wi, 26Ei, 26Ni and 26Si which are nearer to the illuminating point 23 are arranged on intersections between a first circle Ci with the illuminating point 23 set as a center and the x and y axes, and the four receiving points 26Wo, 26Eo, 26No and 26So which are farther from the illuminating point 23 are arranged on intersections between a second circle Co having a larger diameter than the first circle Ci and having the illuminating point 23 set as a center and the x and y axes.

Figure 3A:
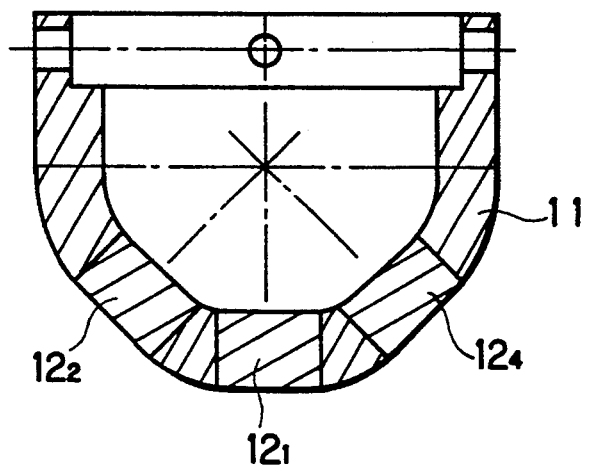
FIGS. 3A and 3B are a side view (cross section) and a bottom view of the sensor unit attached to a probe body.
Figure 3B:
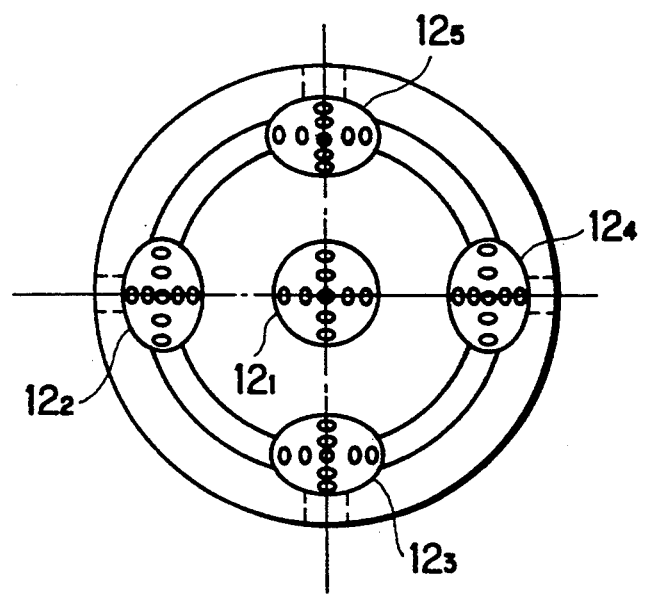

A plurality of sensor units with the above structure are combined to constitute a front end portion of the optical probe 1. FIGS. 3A and 3B show the state in which five sensor units 121 to 125 are attached to the probe body 11. The sensor unit 121 is arranged on the front central portion of the probe body 11 and the other four sensor units 122, 123, 124 and 125 are arranged at a 90 deg. interval around the sensor unit 121. The detective surface 20 of each sensor unit 12 is set to correspond to the spherical surface of the probe body 11.

Figure 4A:
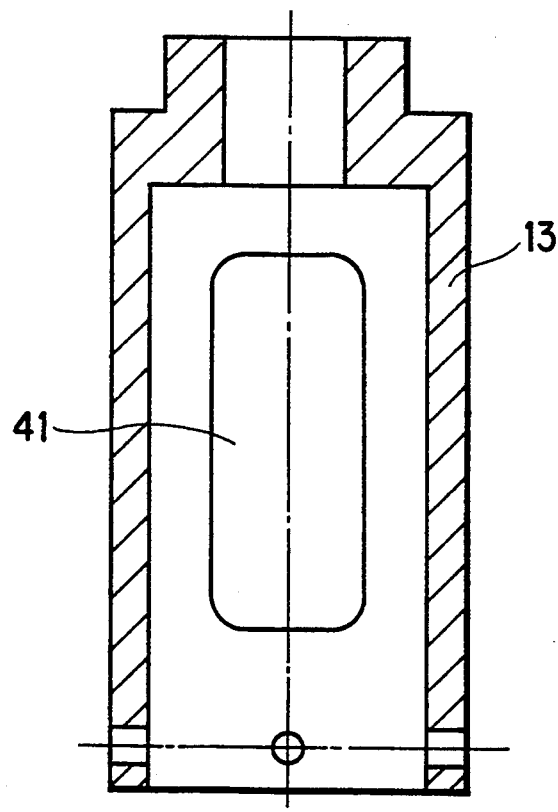
FIGS. 4A and 4B are a side view (cross section) and a bottom view of a probe shank.
Figure 4B:
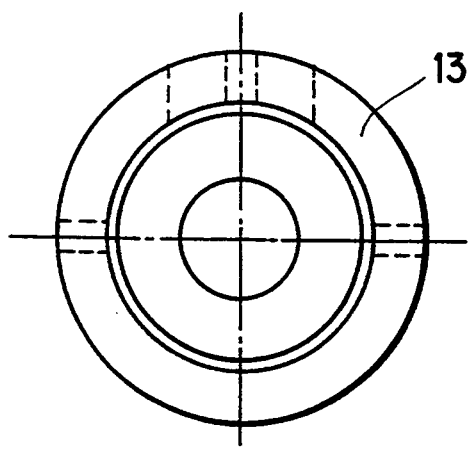

FIGS. 4A and 4B show a probe shank 13 to which the probe body 11 is attached. The upper end portion of the probe body 11 is engaged into and fixed by screws on the lower end portion of the probe shank 13. Although not shown in the drawing, the upper end portion of the probe shank 13 is attached to an electric probe head by use of screws. A window 41 formed in the side wall of the probe shank 13 is used to lead the optical fibers coupled to the respective sensor units 12 to the exterior.

FIG. 5 shows the state of illumination by the selfoc micro lens 22 and illuminating fiber 14 of the sensor unit. The spreading angle $\alpha$ of light incident on the lens 22 from the fiber 14 depends on the numerical aperture (NA) of the fiber 14 and is determined by the following equation.

$$\sin \alpha = NA$$

The position of an imaginary point light source is determined by the spreading angle $\alpha$.

Assuming that a distance between the imaginary point light source and the lens 22 is L1, a distance between the lens 22 and the focused point of light from the lens 22 is L2 and the length of the lens 22 is L0, then the relation between L1 and L2 can be defined by the following equation.

$$L2 = \frac{1}{aNo} \cdot \frac{No\,L1\,a\cos(aL0) + \sin(aL0)}{No\,L1\,a\sin(aL0) + \cos(aL0)}$$

In the above equation, a indicates an index gradient constant of the lens 22, and No indicates a refractive index. The constants a and No respectively depend on the wavelength of the light source and the lens characteristic. Further, the spreading angle $\beta$ of the illumination beam from the lens 22 is determined based on the above relations. When an LED with the wavelength of 0.733 μm is used as the light source and a lens with a=0.603744 and No=1.60195 is used, one example of the numerical relation between the fiber diameter D, L1, L2 and the spreading angle $\beta$ is that D=0.5 mm, L1=0.46950 mm, L2=2.3588 mm and $\beta$=11.968deg. The small value of the spreading angle $\beta$ indicates an excellent collimating property. In order to reduce the spreading angle $\beta$, it is preferable to reduce the diameter D of the fiber 14 used. For example, when a distance measuring range is set to approx. 4 mm and a converging spot diameter is kept small in the entire range, it is preferable to set the relation that D=0.3 mm, L1=0.27180 mm, L2=4.00149 mm and $\beta$=7.122 deg.

Now, the operation of measuring the distance to the object and the tilt of the measurement surface of the object by use of the measuring device with the above structure is explained with much attention paid to one of the sensor units. The basic principle of the distance measurement by use of the sensor unit of this embodiment is based on the fact that a difference between the amount of reflected light detected at one position near one of the illuminating points and the amount of reflected light detected at another position far from the illuminating point when a light is applied to the object from the illuminating point depends on a to-be-measured distance. Concretely speaking, a light is applied to the object from the illuminating point 23 in FIG. 2B and the reflected light is detected at the two receiving points 26Si and 26So lying on the x axis, for example. Since a difference between the amounts of reflected light received at this time at the two receiving points 26Si and 26So depends on the distance from the probe to the object, the distance can be measured in principle. However, in this case, influence by variations in the tilt of the measurement surface of the object, the illumination amount and the reflectance of the object is large. Therefore, in this embodiment, eight receiving points 26 are arranged around the illuminating point 23 as shown in FIG. 2B in order to effect the more precise distance measurement.

In FIG. 2B, output signals from the receiving points 26Ei, 26Eo, 26Wi, 26Wo, 26Ni, 26No, 26Si and 26So for receiving the reflected light are respectively indicated by Ei, Eo, Wi, Wo, Ni, No, Si and. So. In this embodiment, a gap distance Z is derived based on the following equation (1) or (2) by use of the above output signals.

$$Z = \frac{(Ei + Wi + Ni + Si) - (Eo + Wo + No + So)}{Ei + Wi + Ni + Si + Eo + Wo + No + So} \quad (1)$$

$$Z = \frac{Ei - Eo}{Ei + Eo} + \frac{Wi - Wo}{Wi + Wo} + \frac{Ni - No}{Ni + No} + \frac{Si - So}{Si + So} \quad (2)$$

The equation (1) may mean that differences between the reflected light amounts detected at four receiving points arranged on the first inner circle Ci with the illuminating point 23 set as its center and the reflected light amounts detected at four receiving points arranged on the second outside circle Co are normalized by the total light amounts. In the equation (2), the normalization process is effected for each output pair. The above calculations are effected by the processing circuit 14 of FIG. 1. As will be described later, a more precise distance value can be obtained by using the equation (1).

Figure 6:
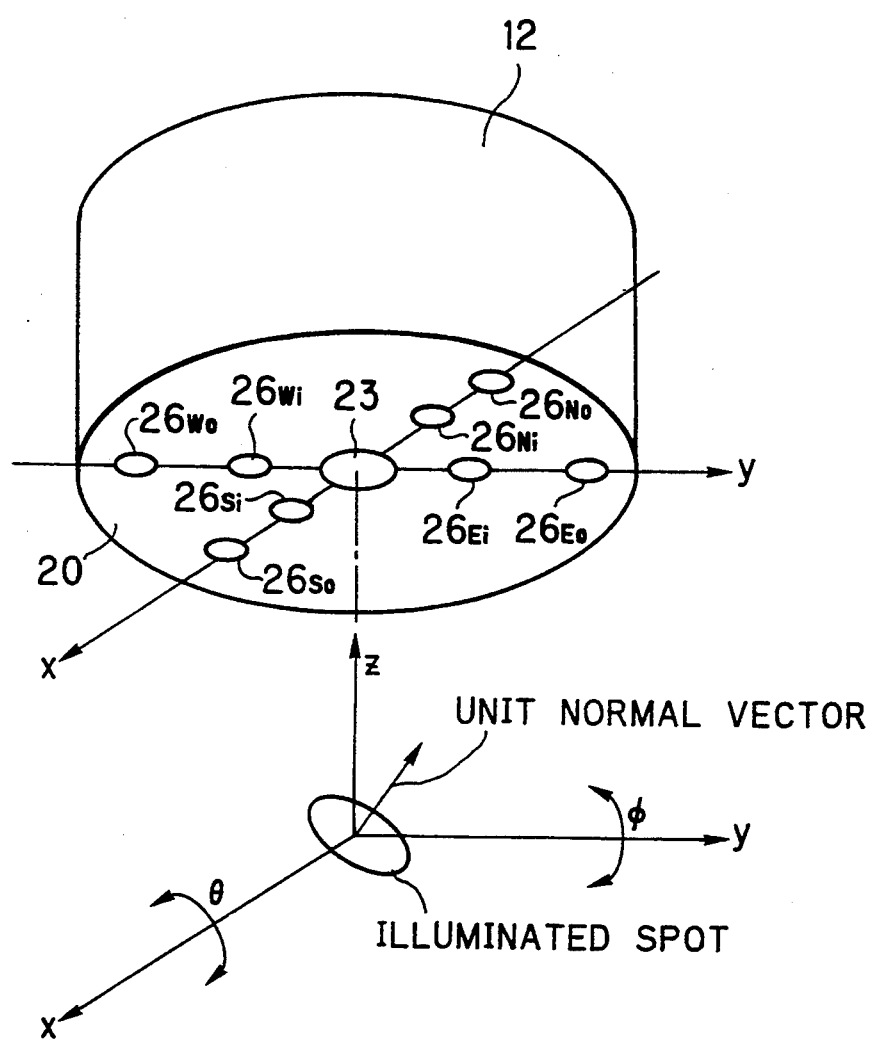
FIG. 6 shows a coordinate system for measuring a unit normal vector by use of the sensor unit.

Next, the operation of measuring the unit normal vector effected by use of one of the sensor units of this embodiment is explained. FIG. 6 indicates a coordinate system for measurement of the unit normal vector. As shown in FIG. 6, the vector of the normal indicating the tilt of the measurement surface in the x-y coordinate system set in the detective surface 20 of the sensor unit is represented by a rotation angle $\theta$ around the x axis and a rotation angle $\phi$ around the y axis with respect to the perpendicular (that is, z axis in FIG. 6) to the detective surface 20. The angle $\theta$ depends on a difference between the reflected light amounts obtained at the internal receiving points 26Ei and 26Wi arranged on the y axis on both sides of the illuminating point 23, and at the same time, it depends on a difference between the reflected light amounts obtained at the outside receiving points 26Eo and 26Wo. Therefore, in principle, it is possible to derive the angle $\theta$ based on output signals obtained from the two receiving points arranged with the illuminating point 23 set therebetween. In this embodiment, the angle $\theta$ is derived by averaging output signals obtained from the four receiving points as indicated by the equation (3).

$$\theta = \frac{(Ei + Eo) - (Wi + Wo)}{Ei + Eo + Wi + Wo} \quad (3)$$

Likewise, the rotation angle $\phi$ around the y axis is derived by the following equation (4).

$$\phi = \frac{(Ni + No) - (Si + So)}{Ni + No + Si + So} \quad (4)$$

Like the former distance measuring case, in the equations (3) and (4), the normalization by use of the total reflected light amount is effected to reduce the influence by the intensity of the light source and the like. The process for deriving the unit normal vector ($\theta$, $\phi$) can be easily effected by use of the processing circuit 4.

Next, the characteristic of the sensor unit of the optical probe of this embodiment is explained by use of simulation data and experimental data.

Figure 7:
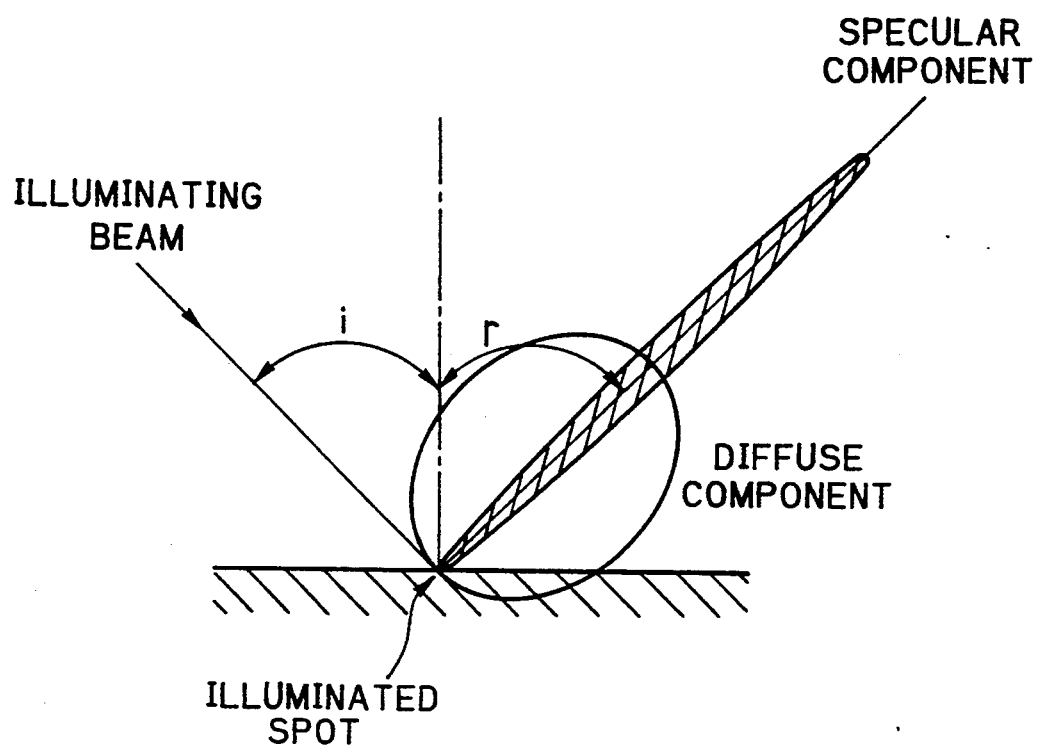
FIG. 7 shows the distributions of an illumination beam and the reflected light component.

A light beam emitted from the sensor unit has a finite diameter in practice, but at the first stage of simulation, it is assumed that a spot of diameter 0 is formed on the measurement point. At this time, the reflected light distribution in the spot can be represented by two eclipses of specular component and diffuse component as shown in FIG. 7. The specular component is a reflected component according to the geometrical optics in a case wherein the measurement surface is a perfectly flat surface and the incident angle i and reflection angle r are equal to each other. The diffuse component is a reflected component which is caused by the minute irregularity of the measurement surface and to which the relation of i=r is not applied. The shapes and areas of the two eclipses vary according to the surface reflectance characteristic of the measurement surface. Therefore, in the simulating operation, the shapes and area ratio of the two eclipses are adequately set.

Figure 8:
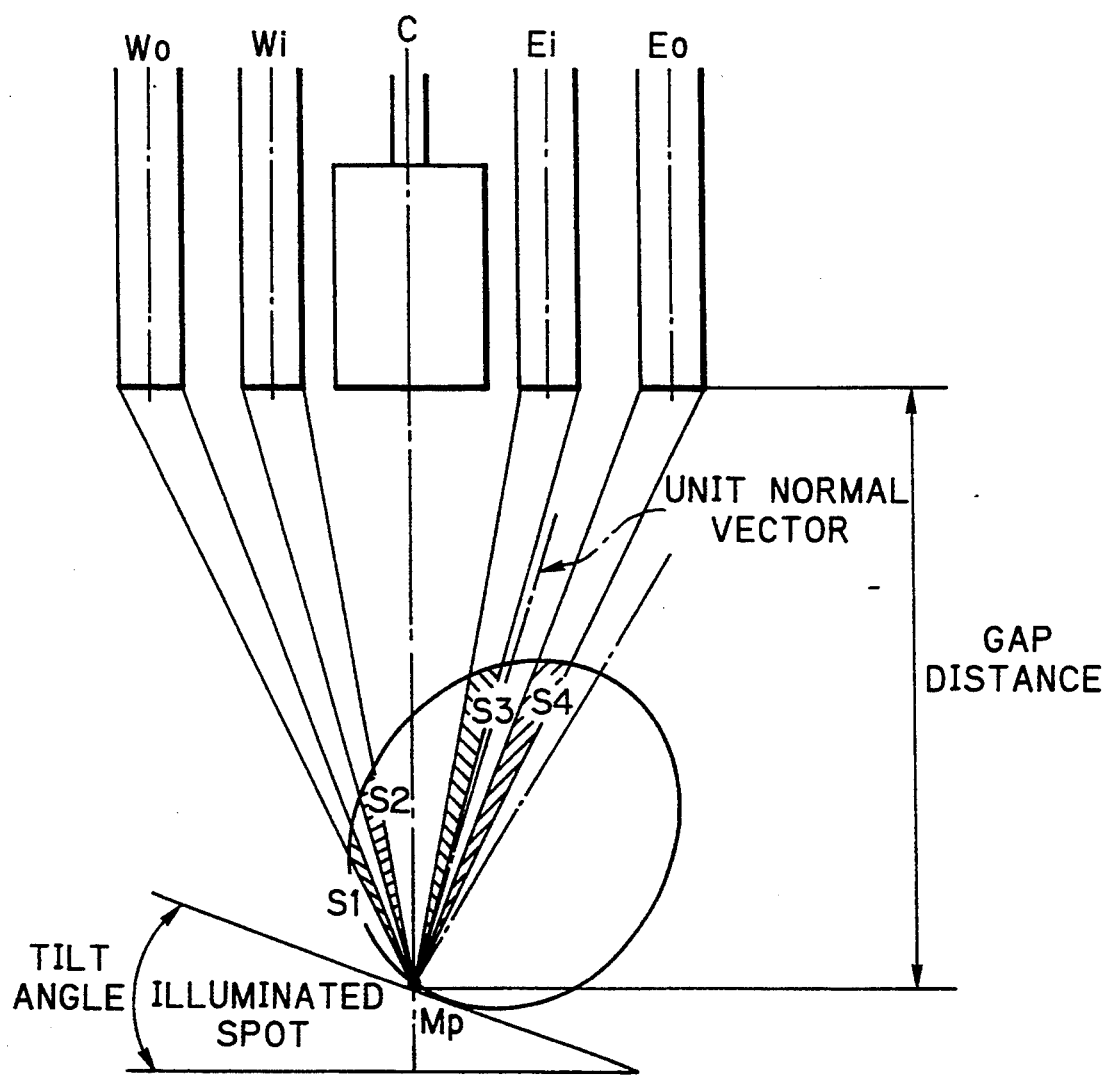
FIG. 8 shows a method for calculating an amount of light detected by a receiving fiber.

FIG. 8 shows the method of calculating the light amount detected by the receiving fiber in the simulating operation. In this example, only the reflected light amounts Wo, Wi, Ei, Eo obtained in the row of four receiving fibers on the y axis are treated, but the reflected light amounts obtained in the row of fibers on the x axis are treated in the same manner. An incident light on the receiving fiber depends on NA of the receiving fiber. As shown by the hatched portion in FIG. 8, in this simulation, the amount of light detected by the receiving fiber is calculated as the sum of the area of the eclipse of specular component and the area of the eclipse of diffuse component. Assuming that the diameter of the receiving fiber is 0.75 mm, NA is 0.47, the distance of the internal receiving fiber from the center of the sensor unit is 1.325 mm and the distance of the outside receiving fiber from the center of the sensor unit is 2.15 mm, then the light amounts Wo, Wi, Ei and Eo obtained in the respective receiving fibers are simulated to derive the dimensionless number Gp corresponding to the gap distance expressed by the equation (5) and the dimensionless number Ti corresponding to the tilt angle of the normal expressed by the equation (6). The equation (5) corresponds to the former equation (1) and the equation (6) corresponds to the former equation (3).

$$Gp = \frac{(Ei + Wi) - (Eo + Wo)}{Ei + Wi + Eo + Wo} \quad (5)$$

$$Ti = \frac{(Ei + Eo) - (Wi + Wo)}{Ei + Wi + Eo + Wo} \quad (6)$$

Figure 9A:
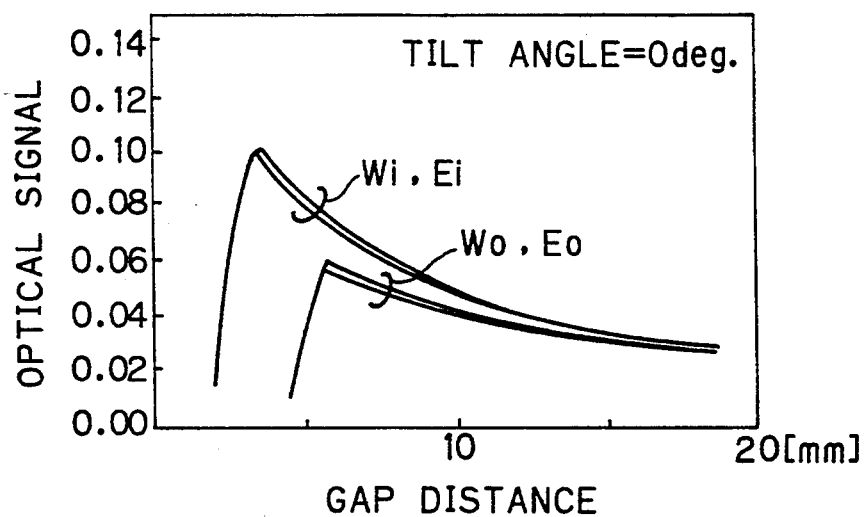
FIGS. 9A and 9B show the relation between a received light amount and a gap distance obtained by simulation.
Figure 9B:
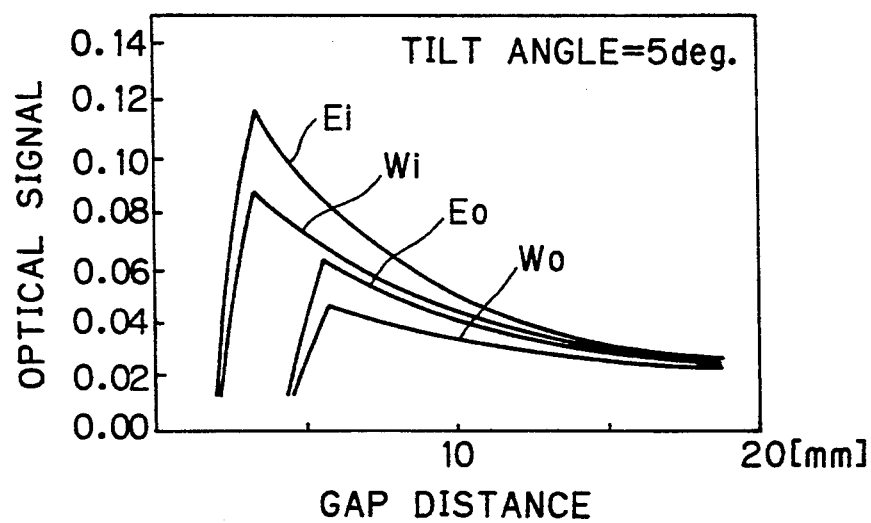

FIGS. 9A and 9B respectively show the relations between the received light amount and the gap distance obtained in a case where the tilt angle of the measurement surface is 0 deg. and 5 deg. The area ratio of the specular component to the diffuse component is specular component/diffuse component=1/15. In a case where the tilt angle was changed 5 deg. at a time from 0 deg. to 45 deg., the same result was obtained.

Figure 10A:
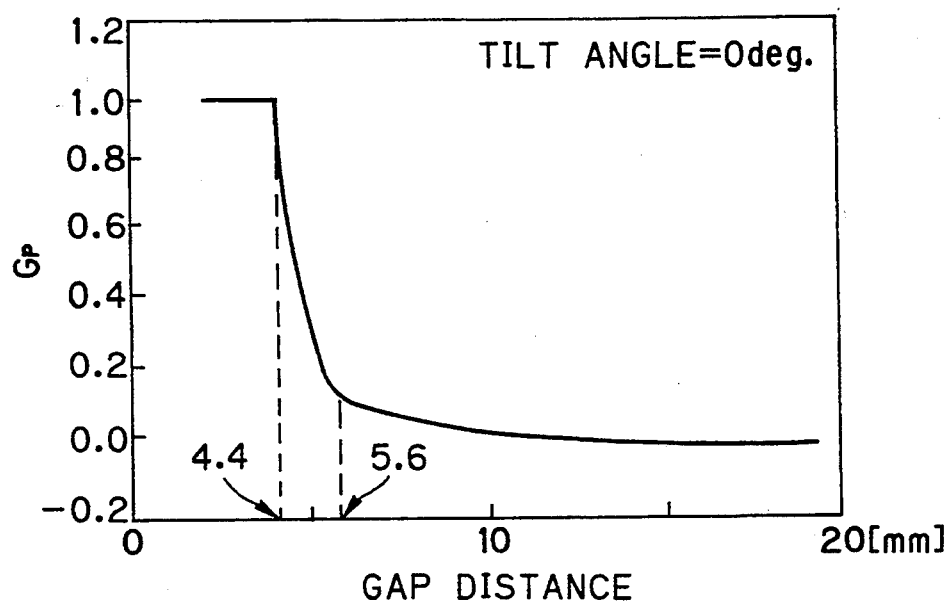
FIGS. 10A and 10B show the relation between a dimensionless number Gp and a gap distance obtained by simulation.
Figure 10B:
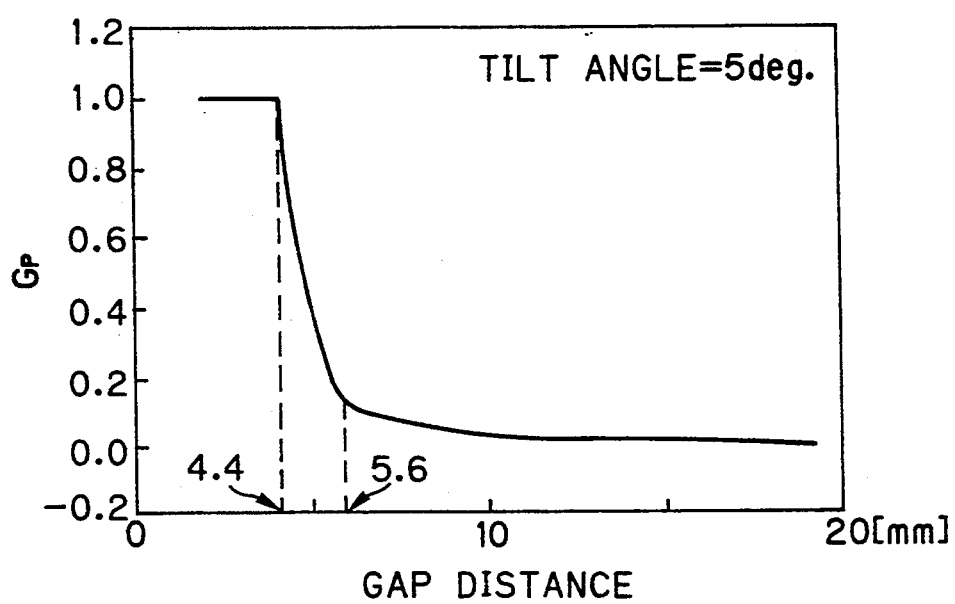

It is understood from the above results that the gap distance for permitting detection of the reception signal to be started depends on the distance between the center of the sensor unit and the receiving fiber. The results of the relation between the gap distance and the dimensionless number Gp derived based on the equation (5) by use of data of the received light amounts are shown in FIGS. 10A and 10B. It is clearly understood from the results shown in FIGS. 10A and 10B that the dimensionless number Gp is sensitive to a variation in the gap distance in the range of 4.4 mm to 5.6 mm and the relation between the dimensionless number Gp and the gap distance exhibits a relatively linear characteristic. Further, the result obtained in the case of tilt angle of 0 deg. agrees extremely well with the result obtained in the case of tilt angle of 5deg. This means that the gap distance measurement can be effected without being influenced by the tilt of the measurement surface.

Figure 11A:
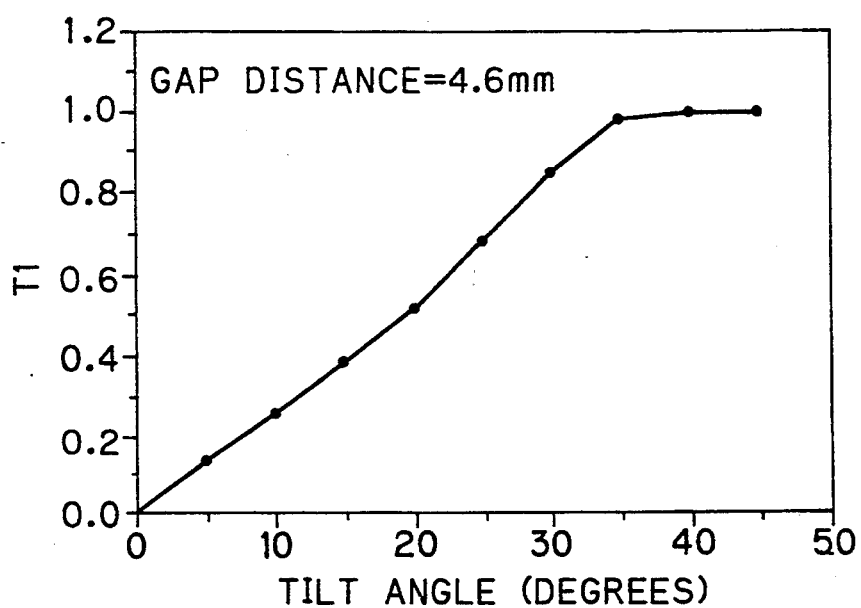
FIGS. 11A and 11B show the relation between a dimensionless number Ti and a tilt angle obtained by simulation.
Figure 11B:
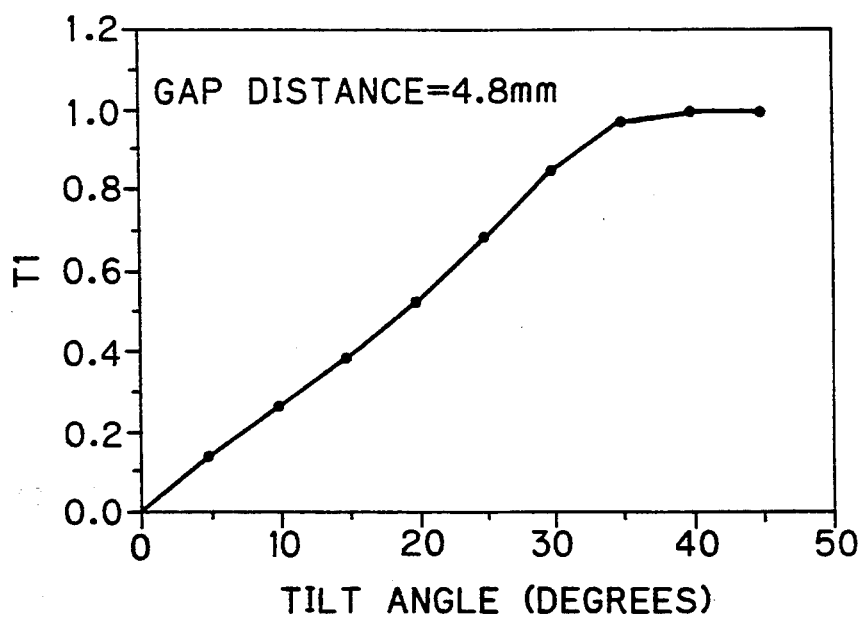

FIGS. 11A and 11B show the relations between the tilt angle of the measurement surface derived based on the equation (6) and the dimensionless number Ti which are respectively obtained when the gap distance is set to 4.6 mm and 4.8 mm. The results shown in FIGS. 11A and 11B agree extremely well with each other. The same results could be obtained in the range of 4.4 mm to 5.6 mm. The results indicate that the dimensionless number Ti is not sensitive to a variation in the gap distance, the dimensionless number Ti is substantially proportional to the tilt angle in the range of 0 deg. to 35 deg., and the measurement range of the tilt angle is ±35 deg.

From the above results of simulation, it is clearly understood that the gap distance can be measured without being influenced by the tilt of the measurement surface by using the dimensionless number Gp derived based on the equation (5) and the tilt angle can be derived without being influenced by the gap distance by using the dimensionless number Ti derived based on the equation (6).

In the actual measurement, a measurement error due to the incomplete collimation of the illumination beam and deviation of the optical axis in the sensor unit may occur. A method of compensating for the measurement error to attain the more precise measurement is explained below.

Figure 12:
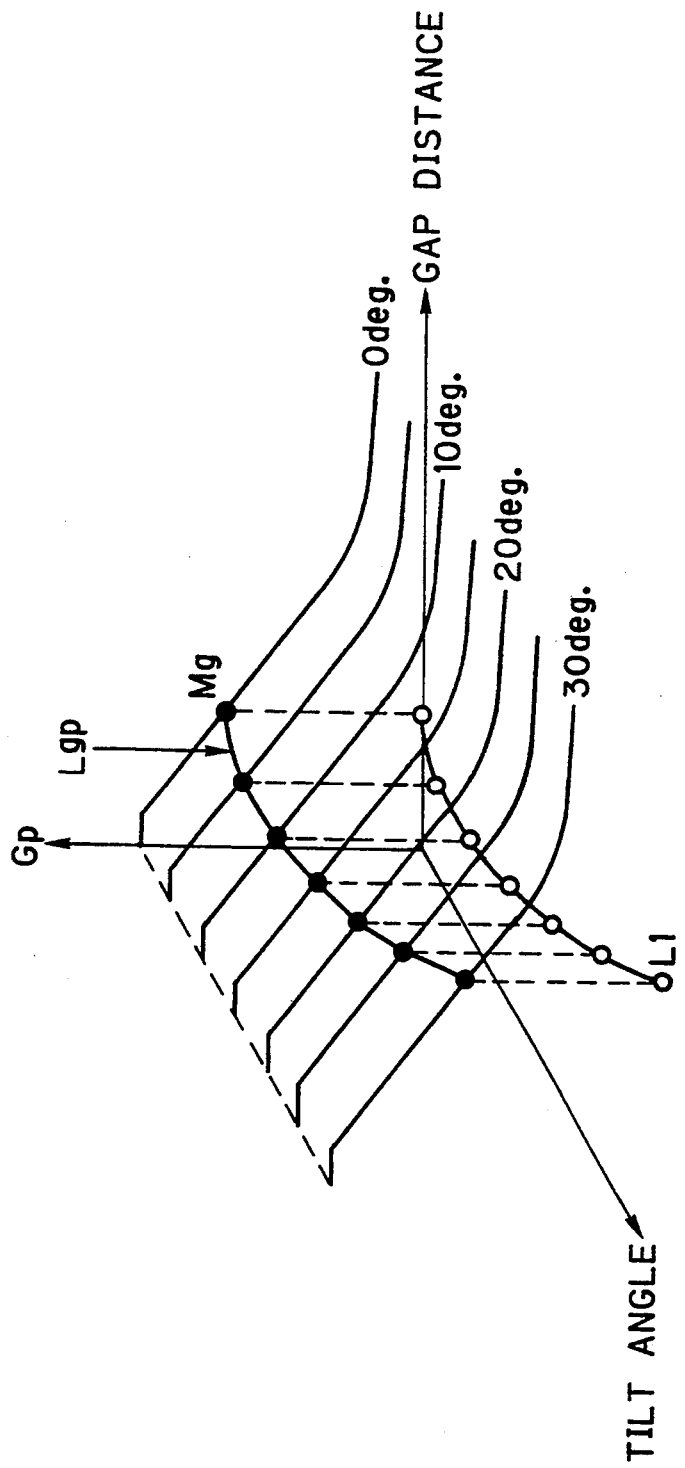
FIG. 12 shows a calibration curve of the dimensionless number Gp with respect to the gap distance and tilt angle.
Figure 13:
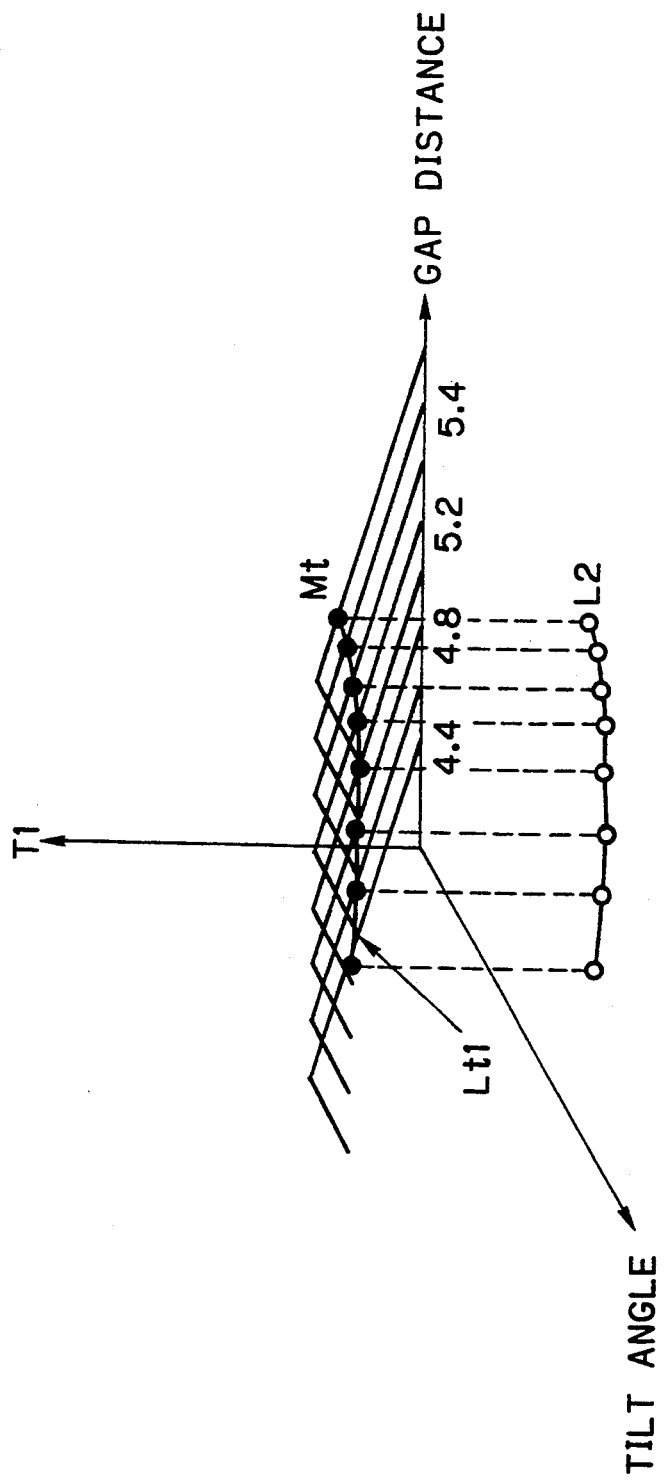
FIG. 13 shows a calibration curve of the dimensionless number Ti with respect to the gap distance and tilt angle.

First, the gap distance and tilt angle are adequately set with respect to the reference plane of a proper sample in the respective measurement ranges, the amounts of reflected light obtained in the receiving fibers of the sensor unit are measured. Then a plurality of relational curves each of which indicates the relation between the gap distance Z and an output signal Zs corresponding to the gap distance Z obtained when the tilt angle is variously changed are derived. Likewise, a plurality of relational curves each of which indicates the relation between the tilt angle T of the unit normal vector at the measurement point and an output signal Ts corresponding to the tilte angle T are derived. These output signals Zs and Ts correspond to the above-described dimensionless number Gp and Ti, respectively. FIGS. 12 and 13 show calibration data curves of dimensionless numbers Gp and Ti with respect to the gap distance and tilt angle obtained in the above-described manner.

Next, the measurement for an actual to-be-measured object is effected under a condition of a certain gap distance and tilt angle. By this measurement, an output signal Zsl corresponding to the gap distance and an output signal Tsl corresponding to the tilt angle are obtained. In this case, assume that the relations Gp=Mg and Ti=Mt are obtained. Based on the above result, the calibration data for Gp is subjected to the linear interpolation to search for points (indicated by a mark ●) satisfying the relation Gp=Mg as shown in FIG. 12. Then, points (indicated by a mark ○) obtained by projecting the above searched points on a Z-T plane at the gap distance Z with the tilt angle T are subjected to the linear interpolation to derive a relational curve L1. Likewise, as shown in FIG. 13, the calibration data for Ti is subjected to the linear interpolation to search for points (indicated by a mark ●) satisfying the relation Ti=Mt. Then, points (indicated by a mark ○) obtained by projecting the above searched points on the Z-T plane are subjected to the linear interpolation to derive a relational curve L2.

Figure 14:
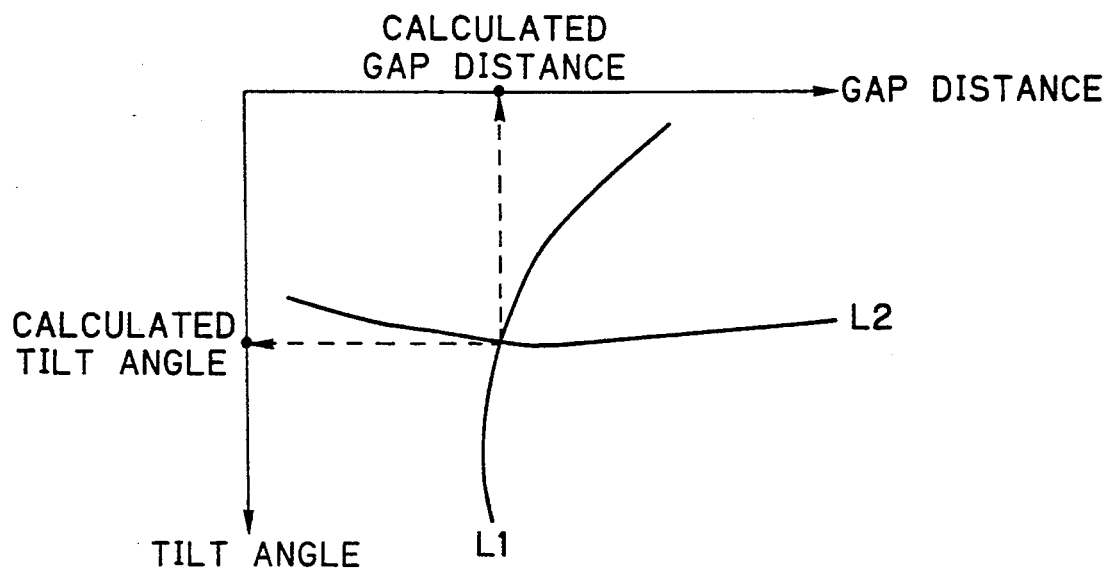
FIG. 14 indicates two relation curves L1 and L2 obtained in FIGS. 12 and 13.

As shown in FIG. 14, the gap distance and tilt angle at the actual measurement point are calculated as an intersection of the two relational curves L1 and L2.

Figure 15:
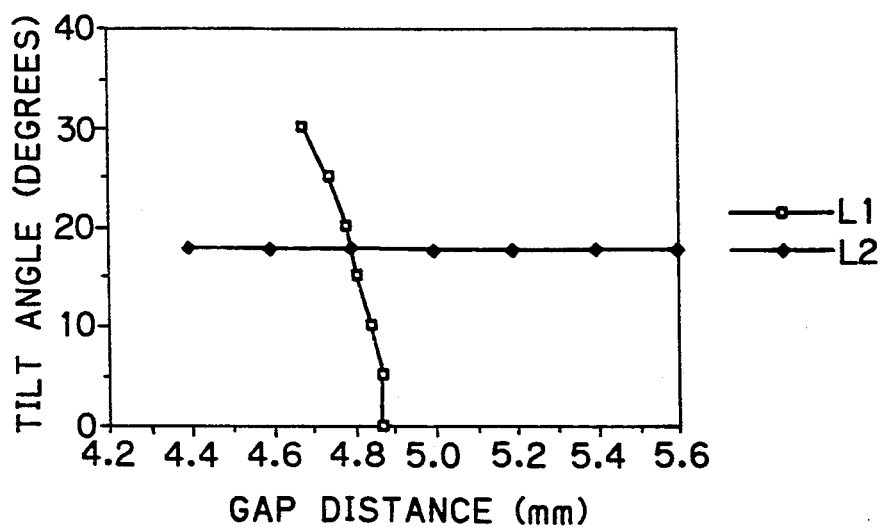
FIG. 15 indicates experimentally obtained two relation curves L1 and L2 corresponding to the curves shown in FIG. 14.

Next, the result obtained by effecting the simulation for estimating the measurement error by use of the above error correction system is explained below. Calibration data items of Gp and Ti were derived under a condition that the measurement interval in the gap distance measurable range of 4.4 mm to 5.6 mm of the measurement surface was set to 2 mm and the measurement interval in the tilt angle measurable range ±35 deg. was set to 5 deg. As the measurement data items, the gap distance=4.8 mm and tilt angle=17.5 deg. were set. The relational curves L1 and L2 obtained at this time are shown in FIG. 15. The gap distance =4.80096 mm and tilt angle=17.07891 deg. are determined based on the intersection of the relational curves L1 and L2. From the above result, it is clearly understood that the measurement error is approx. 1 μm for the distance and approx. 0.08 deg. for the tilt angle and thus a preferable error compensation can be obtained.

Basic experimental data obtained by use of an experimentally manufactured optical probe and by effecting the above error compensation process is explained below.

Figure 16A:
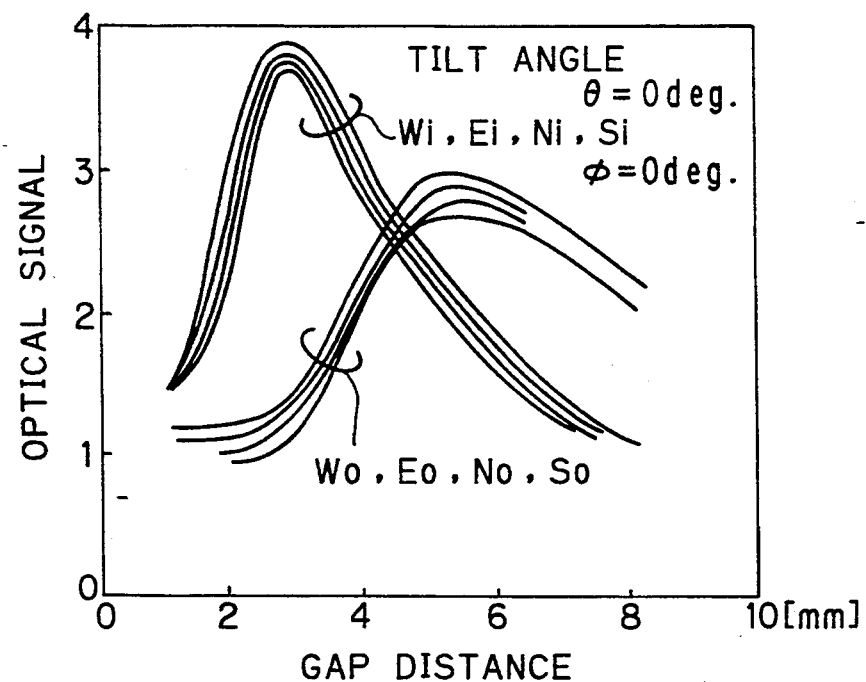
FIGS. 16A and 16B show the relation between the gap distance and a signal corresponding to the amount of light received by the receiving fiber obtained by experiment.
Figure 16B:
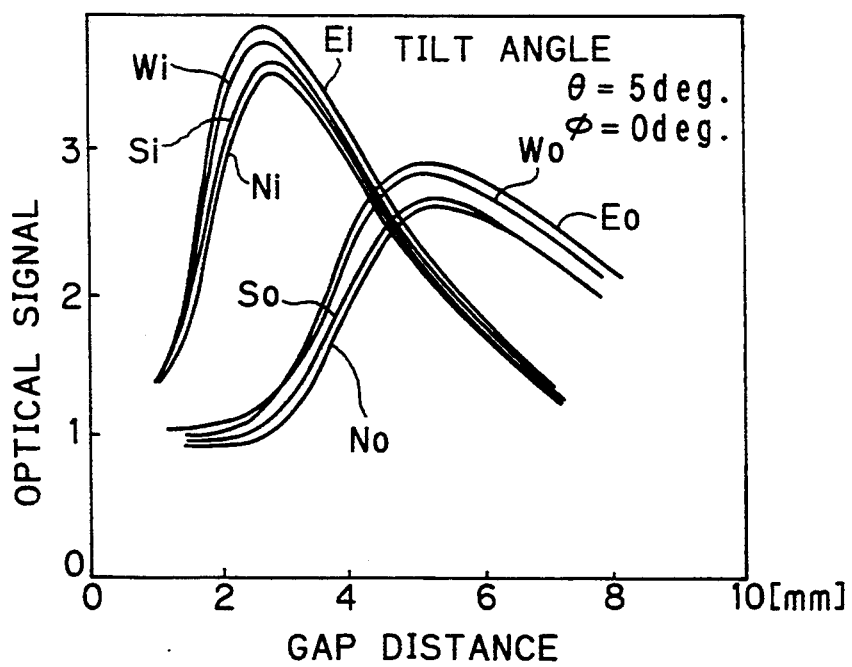

FIG. 16A indicates a relation between the gap distance Z and the output signals (voltage) corresponding to the light amounts respectively detected by eight receiving fibers when the tilt angle is 0 deg. ($\theta=0$ deg., $\phi=0$ deg.). FIG. 16B indicates a relation between the gap distance Z and the output signals (voltage) corresponding to the light amounts respectively detected by the eight receiving fibers when the tilt angle is 5 deg. ($\theta=5$ deg., $\phi=0$ deg.).

Figure 17A:
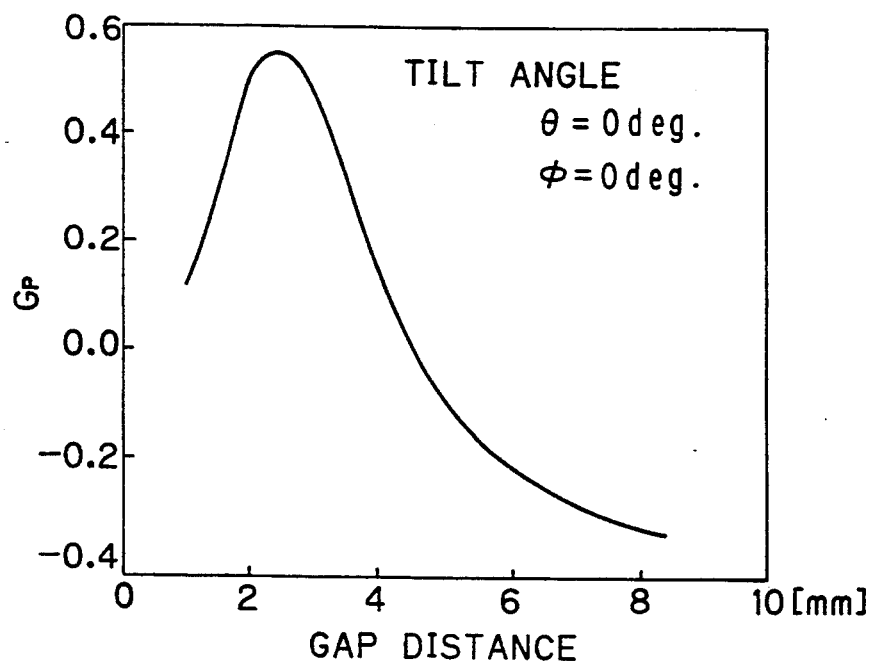
FIGS. 17A and 17B show the relation between the gap distance and a dimensionless number Gp obtained by experiment.
Figure 17B:
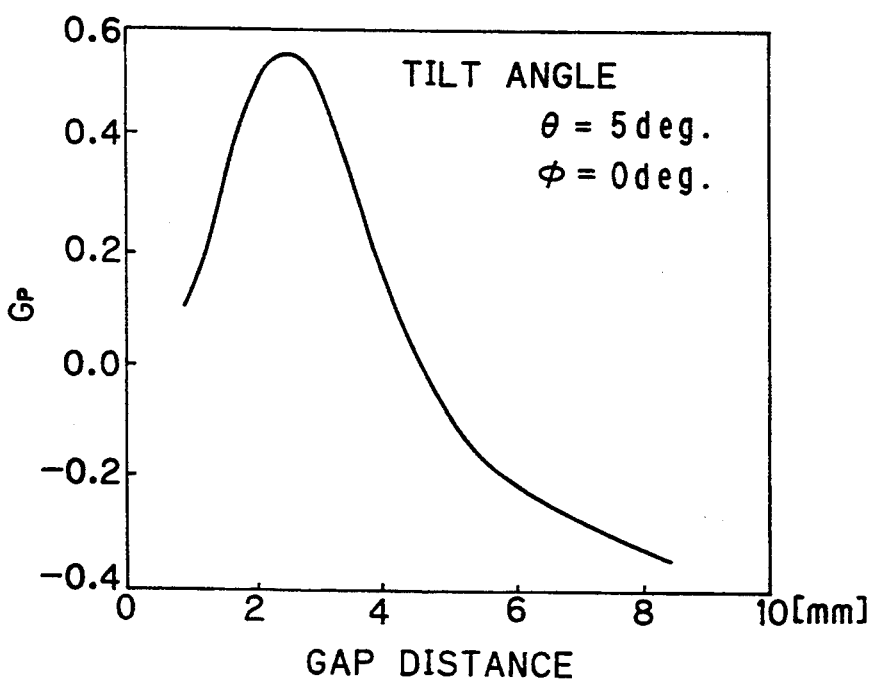

FIG. 17A indicates a relation between the gap distance Z and dimensionless number Gp when the tilt angle is 0 deg. ($\theta=0$ deg., $\phi=0$ deg.). FIG. 17B indicates a relation between the gap distance Z and dimensionless number Gp when the tilt angle is 5 deg. ($\theta=5$ deg., $\phi=0$ deg.).

Figure 18A:
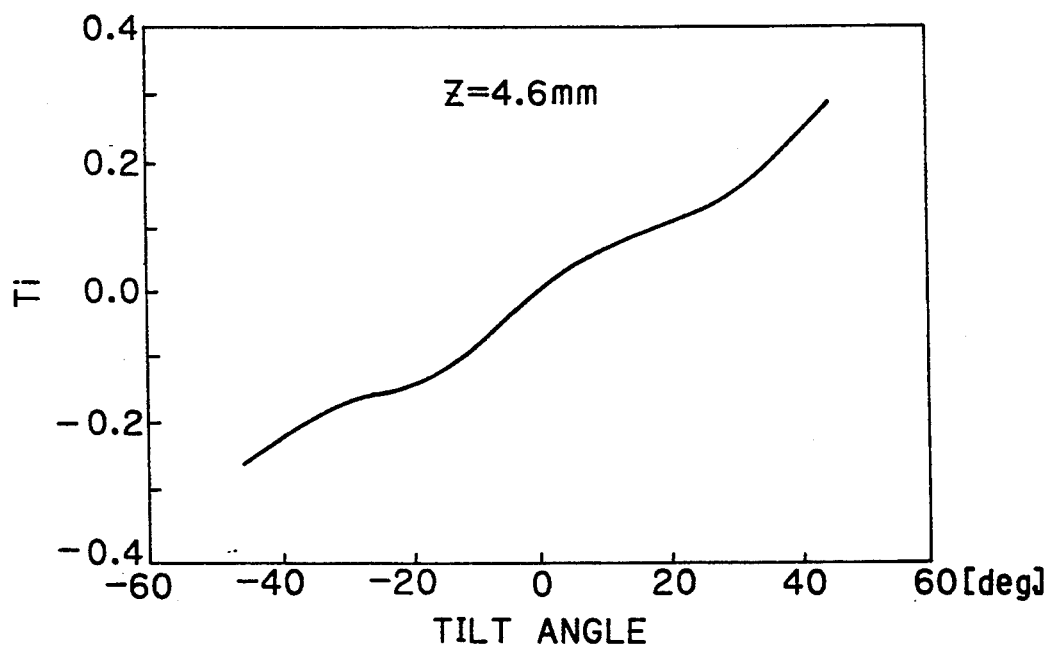
FIGS. 18A and 18B show the relation between the gap distance and a dimensionless number Ti obtained by experiment.
Figure 18B:
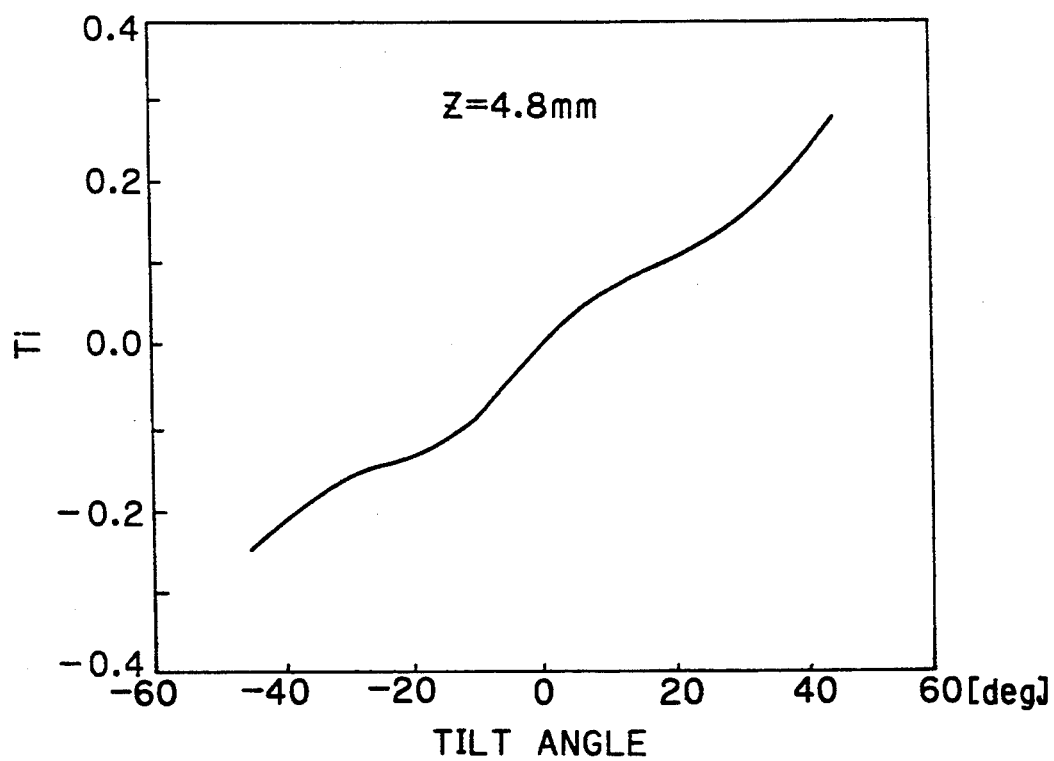

FIG. 18A indicates a relation between the tilt angle and dimensionless number Ti when the gap distance Z is 4.6 mm. FIG. 18B indicates a relation between the tilt angle and dimensionless number Ti when the gap distance Z is 4.8 mm.

The experimental data of FIGS. 16A and 16B corresponds to the simulation data of FIGS. 9A and 9B, the experimental data of FIGS. 17A and 17B corresponds to the simulation data of FIGS. 10A and 10B, and the experimental data of FIGS. 18A and 18B corresponds to the simulation data of FIGS. 11A and 11B. By comparing the above data items, it will be clearly understood that the results of simulation and the results of basic experiments agree well with each other from the qualitative point of view.

Figure 19:
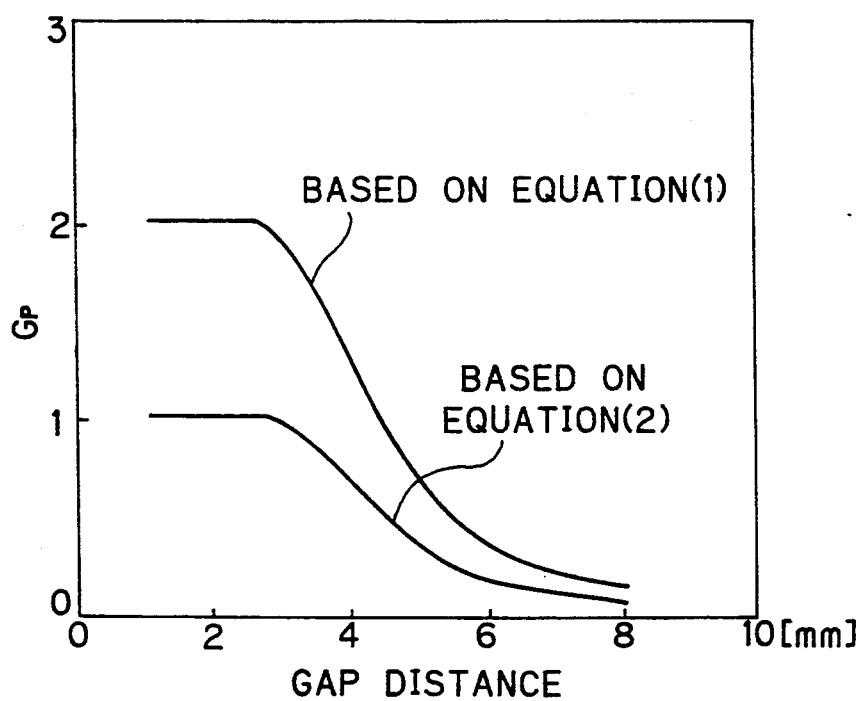
FIG. 19 shows simulation data items obtained by use of equations (1) and (2) and compared with each other.

FIG. 19 shows simulation data items obtained by use of the equations (1) and (2) in comparison with each other. As is clearly seen from FIG. 19, the gradient of the inclined portion used for the distance measurement is larger in the case where the equation (1) is used than in the case where the equation (2) is used, and therefore, it is understood that it is more effective to use the equation (1). Of course, it is possible to effect the distance measurement by use of the equation (2).

The optical probe of this embodiment is constructed by five sensor units arranged on the spherical surface as shown in FIG. 3. With this optical probe, the measurement range of the normal is ±35 deg. as described before. As an optical probe used in an automatic learning control measurement system, it is necessary to set the measurement range of the normal to ±90 deg. For this purpose, it is desired to combine a larger number of sensor units.

Figure 20A:
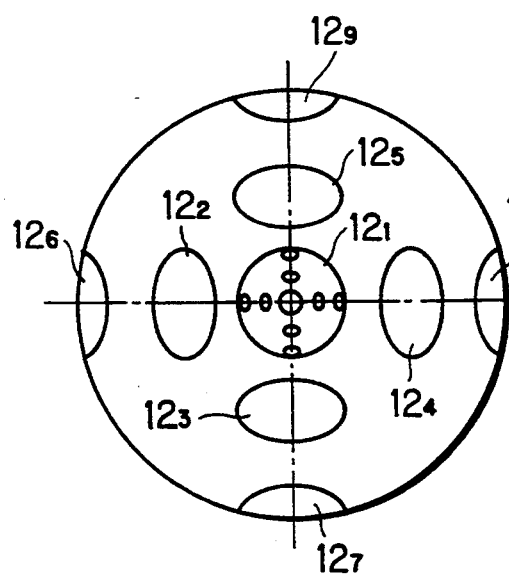
FIG. 20A, 20B an optical probe of an embodiment obtained by a combination of nine sensor units.
Figure 20B:
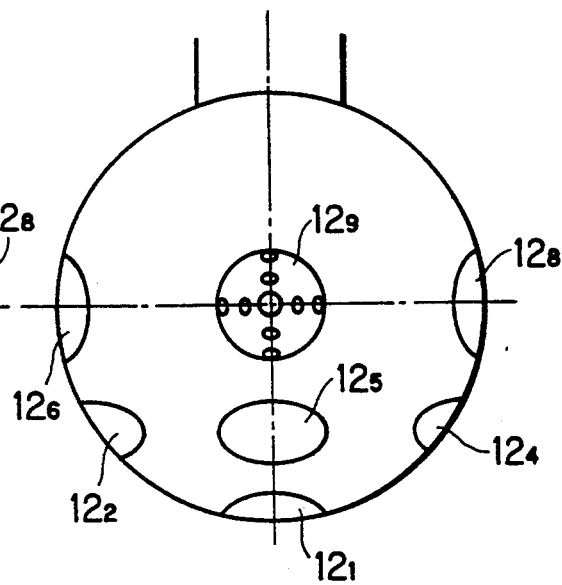
Figure 21A:
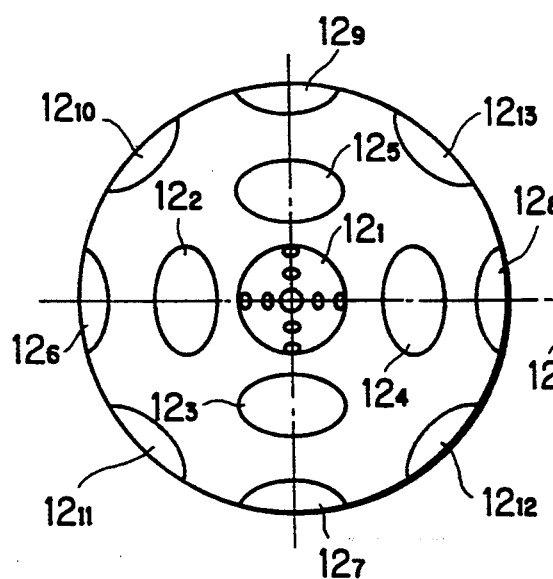
FIG. 21A, 21B shows an optical probe of an embodiment obtained by a combination of thirteen sensor units.
Figure 21B:
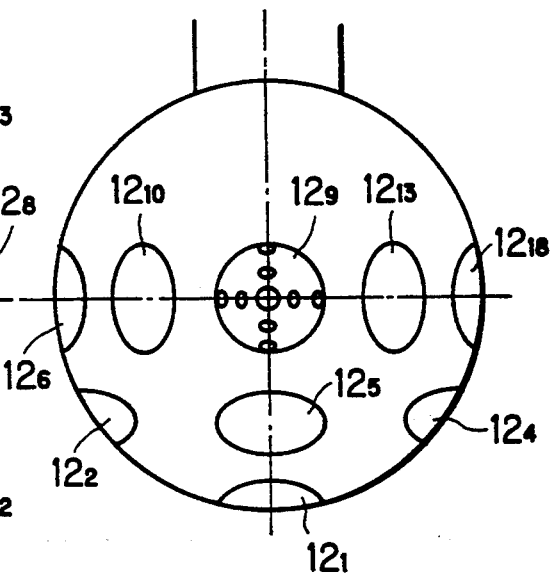

FIG. 20 shows the construction of an optical probe of an embodiment having nine sensor units obtained by adding sensor units 126 to 129 to the array of five sensor units 121 to 125 which are the same as those of the former embodiment. FIG. 21 shows an optical probe of an embodiment having thirteen sensor units obtained by adding four sensor units 1210 to 1213 to the construction of FIG. 20. With the above optical probe, the measurement for the normal range of ±90 deg. can be made without effecting the swinging operation.

In a case where a large number of sensor units are used as shown in FIG. 20 or 21, four receiving points (receiving fibers) are arranged between the illuminating points of adjacent two sensor units. This is an obstacle to miniaturization of the optical probe. In order to attain a small optical probe, it is effective to commonly use the receiving section between adjacent sensor units.

Figure 22:
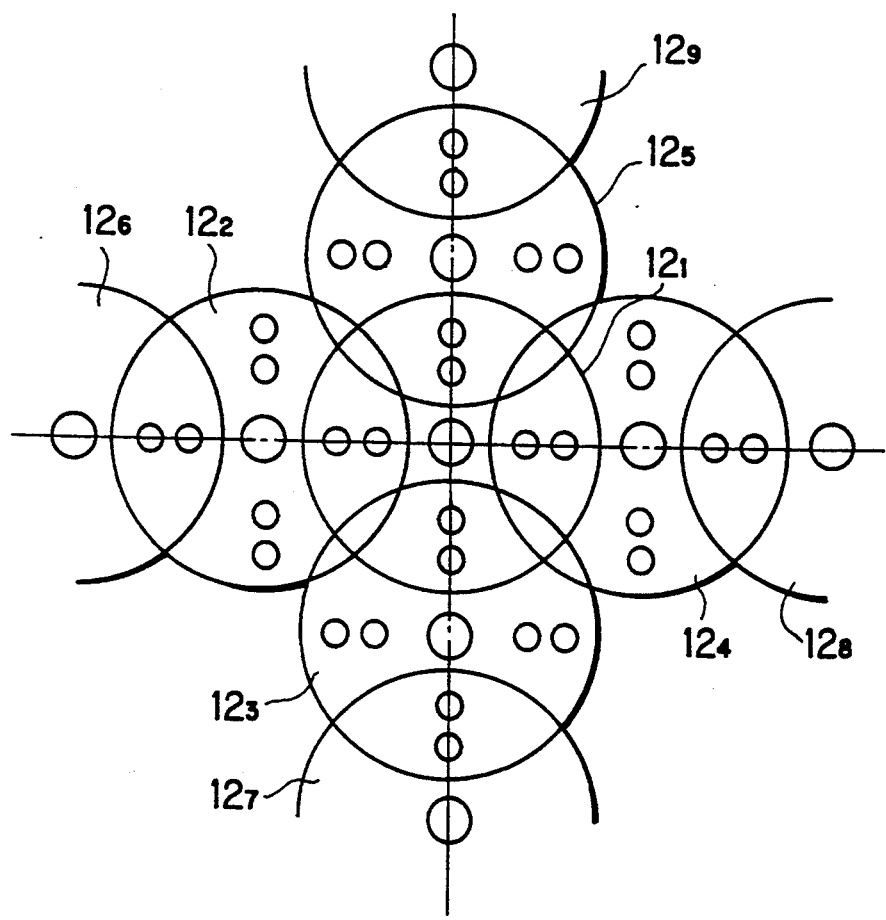
FIG. 22 shows an embodiment in which a plurality of sensor units commonly use the receiving fiber.

FIG. 22 is a diagram showing the optical probe of the embodiment commonly using the receiving fiber between the adjacent sensor units, corresponding to the bottom view of FIG. 20 and drawn by developing the spherical surface.

In a case where the 3-D shape measurement is effected by using the optical probe having a combination of a plurality of sensor units, the sensor units interfere with each other when illuminating lights are simultaneously applied to all of the sensor units. Therefore, it becomes necessary to prevent the interference when an actual 3-D measurement is effected.

Figure 23:
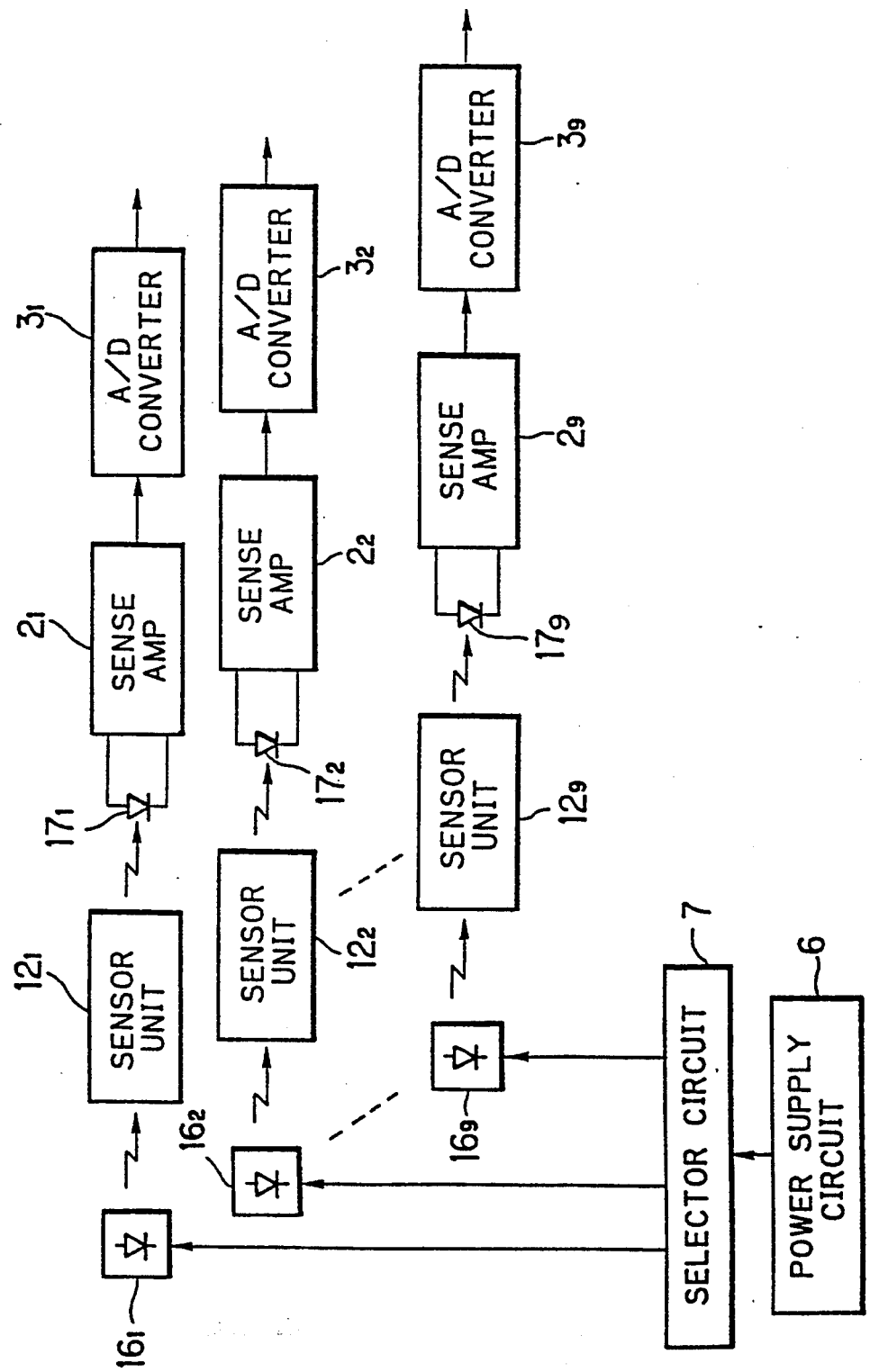
FIG. 23 shows an example of the construction of a measuring system made by use of an optical probe having a plurality of sensor units.
Figure 25:
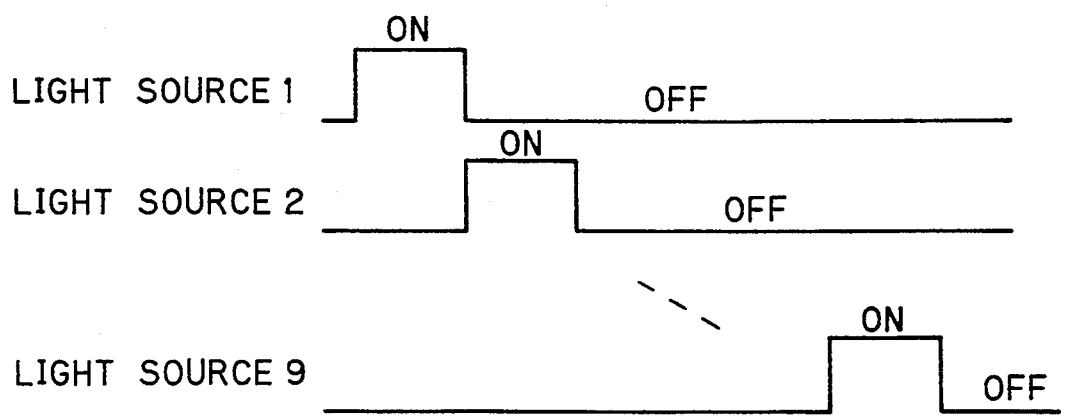
FIG. 25 illustrates the operation of a light source in the system construction of FIG. 23.

FIG. 23 shows the construction of a shape measuring system according to an embodiment obtained by taking the interference preventing process into consideration. In this embodiment, the optical probe has nine sensor units 121 to 129. Outputs of a light source driving power supply circuit 7 are sequentially supplied to light sources 161 to 169 which are provided for the respective sensor units 12 while they are switched at a high speed by a selector circuit 7. FIG. 25 illustrates the light source driving operation in this embodiment.

Figure 24:
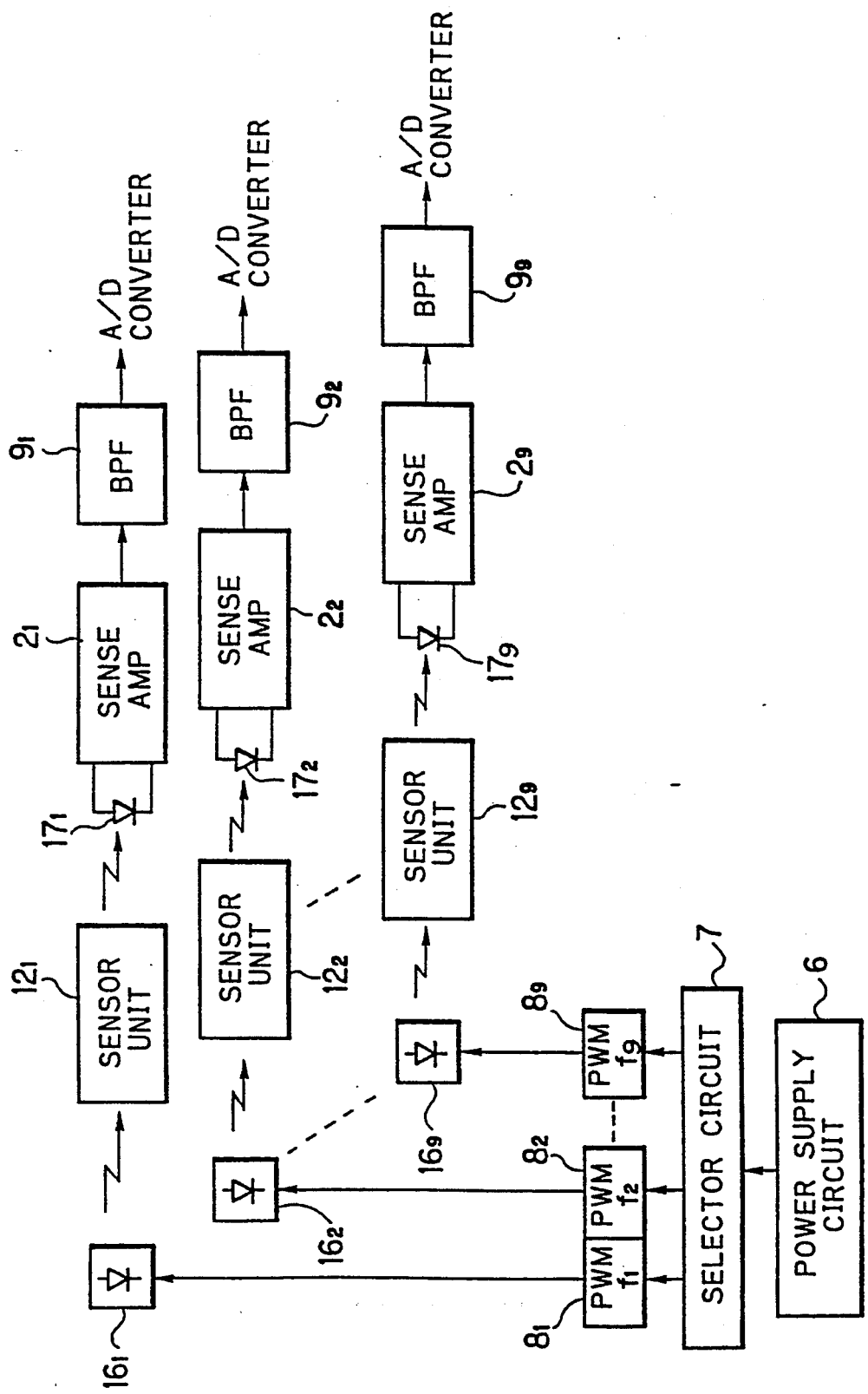
FIG. 24 shows an example of the construction of another measuring system made by use of an optical probe having a plurality of sensor units.
Figure 26:
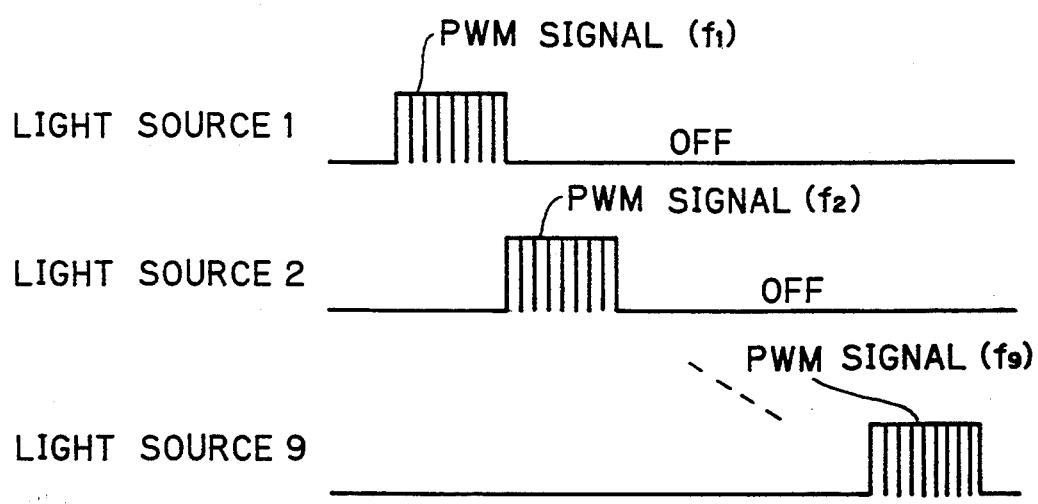
FIG. 26 illustrates the operation of a light source in the system construction of FIG. 24.

FIG. 24 shows an embodiment obtained by modifying the embodiment of FIG. 23. The light sources 161 to 169 are respectively provided with pulse-width modulation (PWM) driving circuits 81 to 89. Like the example of FIG. 23, outputs of the power supply circuit 6 are supplied to the PWM driving circuits 81 to 89 while they are sequentially selected by the selector circuit 7. The PWM driving circuits 81 to 89 generate respective PWM signals having different frequencies f1 to f9. FIG. 26 illustrates the light source driving operation in this embodiment. That is, the light sources 161 to 169 generate ON/OFF-modulated lights.

As shown in FIG. 24, by taking into consideration the fact that the light sources 161 to 169 are driven by the PWM signals, band-pass filters (BPF) 91 to 99 for extracting components of f1 to f9 are respectively provided at the succeeding stages of the sense amplifiers 21 to 29 in the output systems of the sensor units 121 to 129.

By utilizing a combination of the modulated light illumination and the filtering process, the measurement by each of the sensor units can be effected without receiving influence of light from the other sensor unit and environmental light.

In order to drive the light sources by the PWM signals of different frequencies as shown in FIG. 24, it is not always necessary to selectively change the light source driving timings. This is because influence by the other sensor unit can be eliminated by effecting the filtering process of the output system even when all of the sensor units are simultaneously driven.

Figure 27:
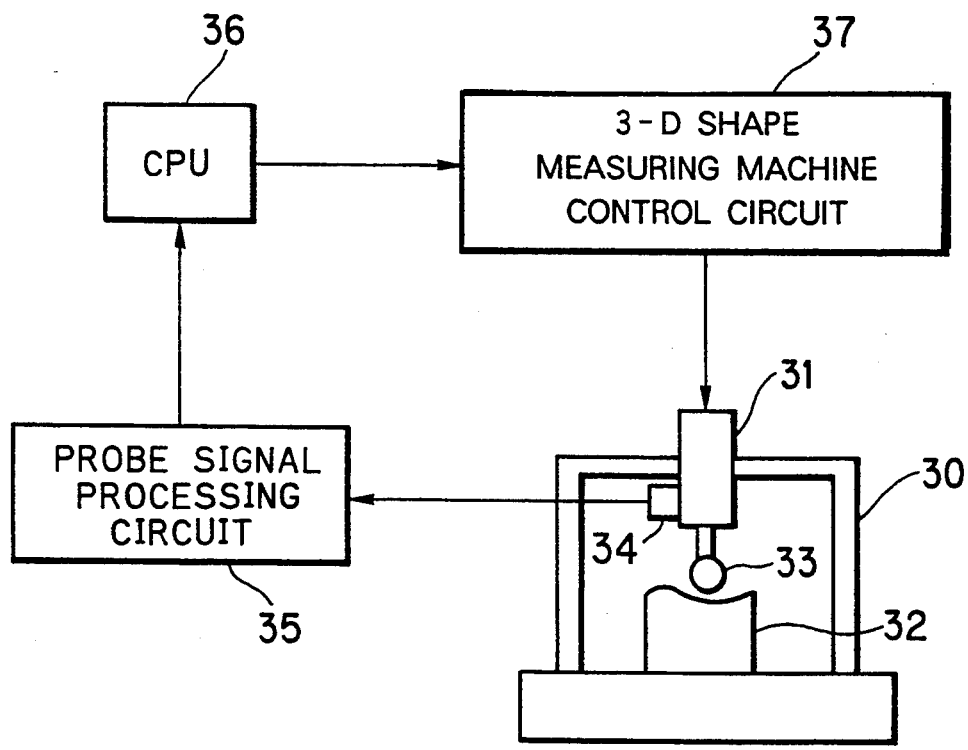
FIG. 27 shows an embodiment in which this invention is applied to a learning control system.

FIG. 27 shows an embodiment in which a measuring device of this invention is applied to a learning control system. The optical probe 33 shown in FIG. 20 or 21 is attached to an electric probe head 31 of a 3-D shape measuring machine 30. An input/output signal of each sensor unit is converted by means of a photoelectric conversion circuit 34 which is arranged near the optical probe 33. As explained in the former embodiment, the position and tilt information of a to-be-controlled object 32 are derived from a plurality of sensor units of the optical probe 33. The output information is supplied to and processed by a probe signal processing circuit 35. The processing operation by the probe signal processing circuit 35 includes a signal creation process for modulated illumination by the light source in addition to a distance and tilt measuring process effected by the calculation process and a filtering process for an output electrical signal from the sensor unit.

Figure 28:
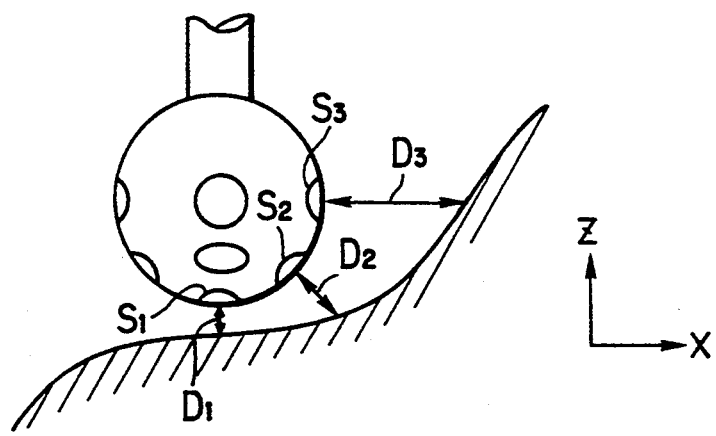
FIG. 28 shows the principle of the learning control operation by the system of FIG. 27.

A CPU 36 effects the comparison between a plurality of distance data items from the probe signal processing circuit 35 and between a plurality of tilt data items to estimate the positional relation between the to-be-measured surface and the probe and determine the learning speed which is suitable in the current condition. Based on the determination, an instruction from the CPU 36 is supplied to a 3-D shape measuring machine control circuit 37 for driving the 3-D shape measuring machine 30. For example, when a to-be-measured surface whose tilt significantly varies as shown in FIG. 28 is learned, a large variation in the tilt can be determined by comparing distances D1, D2 and D3 which are determined by output signals of sensor units S1, S2 and S3. Based on the result of determination, the learning control operation of gradually lowering the speed in the X-axis direction in FIG. 28 and gradually increasing the speed in the Z-axis direction can be effected.

As described above, according to this embodiment, the learning control can be effected without swinging the optical probe. Since there is no movable portion in the optical probe, the high reliability and excellent maintenance can be attained.

In the above embodiments, the light source and light receiving element are arranged in positions separated from the sensor unit. This construction is particularly preferable when an electrical noise generation source is present near the sensor unit. If there is no electrical noise generation source near the sensor unit, the sensor unit and light receiving element can be integrally formed with the sensor unit so as to make the optical probe more compact. The sensor unit of such an embodiment is described below.

Figure 29:
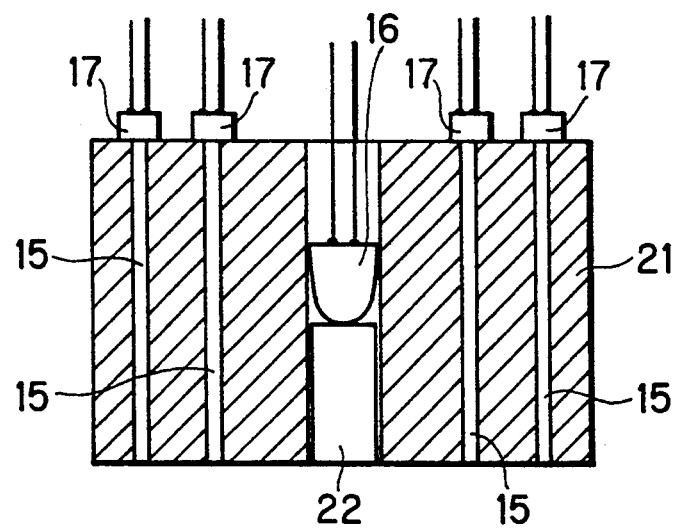
FIG. 29 shows a sensor unit according to another embodiment of this invention.

In FIG. 29, the illuminating fiber 14 used in the former embodiment is omitted and a light source 16 such as a laser diode which is directly connected to a selfoc micro lens 22 is buried in a sensor unit base 21. Further, light receiving elements 17 are disposed directly on the sensor unit base 21 so as to be connected to receiving fibers 15.

Figure 30:
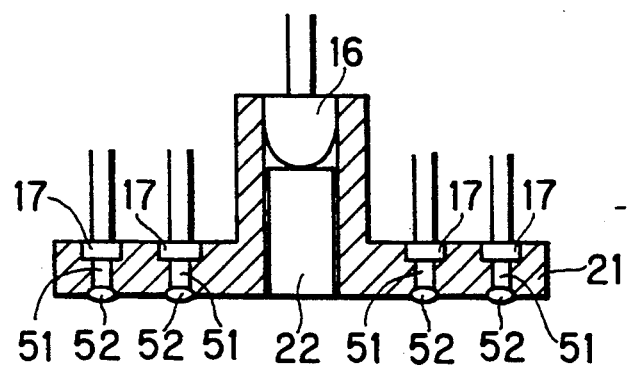
FIG. 30 shows a sensor unit according to still another embodiment of this invention.

In FIG. 30, the sensor unit base 21 is made thin and small light guide holes 51 are formed in positions corresponding to the receiving fibers 15 of the former embodiment. Converging lenses 52 are disposed on one-side end portions of the small light guide holes 51 and light receiving elements 17 are disposed on the other side end portions thereof.

Figure 31:
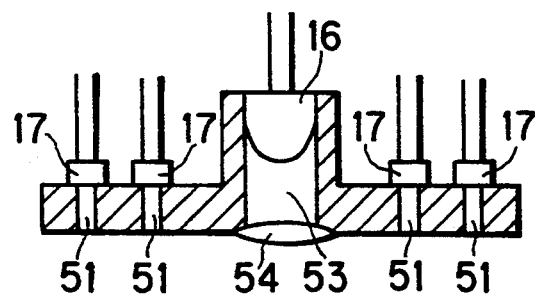
FIG. 31 shows a sensor unit according to another embodiment of this invention.

A sensor unit of FIG. 31 is a modification of the sensor unit of FIG. 30. In this modification, a micro lens 54 is used instead of the selfoc micro lens 22. The illuminated light from the light source 16 attached to the upper end portion of the sensor unit base 21 is transmitted to the micro lens 54 via a small light guide hole 53. The light-receiving section is constructed by small light guide holes 51 and light receiving elements 17 with the micro lenses 52 omitted.

The distance and tilt measurement can be effected in the same manner as in the former embodiment by use of the sensor unit shown in FIGS. 29 to 31. However, since a difference occurs in the detection sensitivity depending on the construction, it is preferable to selectively determine the construction according to the cost and the type of a to-be-measured object.

What is claimed is:

1. A non-contact type shape measuring device for measuring a 3-D shape, comprising:
   (a) an optical probe having a plurality of sensor units which are attached to a probe body having a spherical surface facing a to-be-measured object and whose detective surfaces lie on said spherical surface, said sensor units including illuminating means having an illuminating point arranged at the center of the detective surface facing said to-be-measured object and at least eight light receiving means arranged on two axes passing said illuminating point in said detective surface for receiving a reflected light from said to-be-measured object, light receiving points of said eight light receiving means being symmetrically arranged on said two axes with respect to said illuminating point with four of said light receiving means disposed on each of said two axes; and
   (b) processing means for deriving normal vectors in the position of said to-be-measured object which are illuminated by said sensor units and gap distances between said sensor units and said to-be-measured object which are illuminated by said sensor units and gap distances between said sensor units and said to-be-measured object according to output signals of said sensor unit.

2. A non-contact type shape measuring device according to claim 1, further comprising selecting means for selectively and sequentially activating the measurement operations of said sensor units.

3. A non-contact type shape measuring device for measuring a 3-D shape, comprising:
   (a) an optical probe having a plurality of sensor units which are attached to a probe body having a spherical surface facing a to-be-measured object and whose detective surfaces lie on said spherical surface, said sensor units including illuminating means having an illuminating point arranged at the center of the detective surface facing said to-be-measured object and at least eight light receiving means arranged on two axes passing said illuminating point in said detective surface, for receiving a reflected light from said to-be-measured object, light receiving points of said eight light receiving means being symmetrically arranged on said two axes with respect to said illuminating point with four of said light receiving points disposed on each of said two axes; and
   (b) a plurality of light source modulating means for ON/OFF modulating lights emitted from said illuminating means of said sensor units by different frequencies respectively assigned thereto;
   (c) a plurality of filtering means for extracting frequency components assigned as the modulation frequencies of said respective illuminating means from output signals of said light receiving means of said sensor traits; and
   (d) processing means for deriving normal vectors in the positions of said to-be-measured object which are illuminated by said sensor units and gap distances between said sensor units and said to-be-measured object according to output signals of said filtering means.

4. A non-contact type shape measuring device according to claim 3, further comprising selecting means for selectively and sequentially activating the measurement operations of said sensor units.

5. A non-contact type shape measuring device according to claim 1, wherein each of said illuminating means includes:

collimating means attached to the front end portion of a sensor unit base with one end thereof exposed to the detective surface of said sensor unit and used as an illuminating point;

an illuminating fiber connected to said collimating means; and a light source for introducing a light into said illuminating fiber.

6. A non-contact type shape measuring device according to claim 5, wherein said light source is disposed in a position separated from said sensor unit.

7. A non-contact type shape measuring device according to claim 1, wherein each of said light receiving means includes:

a light receiving fiber attached to a sensor unit base with one end thereof exposed as a light receiving point to the detective surface of said sensor unit; and a light receiving element for receiving the light transmitted via said light receiving fiber.

8. A non-contact type shape measuring device according to claim 7, wherein said light receiving element is disposed in a position separated from said sensor units.

9. A non-contact type shape measuring device according to claim 1, wherein adjacent sensor units among said plurality of sensor units commonly use two of said light receiving means.

10. A shape measuring method for deriving an error-compensated gap distance and tilt angle of a normal vector by using an output signal Zs corresponding to a gap distance Z between a non-contact type probe and a to-be-measured object and an output signal Ts corresponding to a tilt angle T of a normal vector at a measuring point comprising the steps of:

(a) deriving a plurality of relational curves between Z and Zs obtained when a reference sample is held in various angle positions and a plurality of relational curves between T and Ts obtained when said referece sample is held in various angle positions;

(b) deriving a variable Zsl and a variable Tsl for said to-be-measured object;

(c) deriving a relational curve L1 obtained by projecting points of Zs1 on said plurality of relational curves between Z and Zs onto a Z-T plane;

(d) deriving a relational curve L2 obtained by projecting points of Ts1 on said plurality of relational curves between T and Ts onto said Z-T plane; and (e) deriving the error-compensated gap distance and tilt angle of a normal vector from the coordinate point of intersection between the relational curves L1 and L2.

* * * * *

UNITED STATES PATENT AND TRADEMARK OFFICE
CERTIFICATE OF CORRECTION

PATENT NO.     :   5,410,410
DATED          :   April 25, 1995
INVENTOR(S)    :   Yamazaki et al.

It is certified that error appears in the above identified patent and that said Letters Patent is hereby corrected as shown below:

In column 14, claim 1, line 31, please delete "unit" and insert therefor --units--.

In column 14, claim 3, line 62, please delete "traits" and insert therefor --units--.

Signed and Sealed this

Ninth Day of January, 1996

Attest:

BRUCE LEHMAN

*Attesting Officer*     *Commissioner of Patents and Trademarks*

UNITED STATES PATENT AND TRADEMARK OFFICE
CERTIFICATE OF CORRECTION

PATENT NO.    : 5,410,410
DATED         : April 25, 1995
INVENTOR(S)   : Yamazaki et al.

It is certified that error appears in the above identified patent and that said Letters Patent is hereby corrected as shown below:

In column 15, claim 7, line 28, please delete "unit" and insert therefor --units--.

Signed and Sealed this

Second Day of April, 1996

Attest:

BRUCE LEHMAN

*Attesting Officer*        *Commissioner of Patents and Trademarks*